(12) United States Patent
Sato et al.

(10) Patent No.: US 10,152,270 B2
(45) Date of Patent: Dec. 11, 2018

(54) STORAGE SYSTEM

(71) Applicant: Hitachi, Ltd., Tokyo (JP)

(72) Inventors: Takamasa Sato, Tokyo (JP); Takashi Sakaguchi, Tokyo (JP); Azusa Jin, Tokyo (JP); Kensuke Narita, Tokyo (JP); Yosuke Katoh, Tokyo (JP); Takashi Nagao, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 85 days.

(21) Appl. No.: 15/509,597

(22) PCT Filed: Nov. 28, 2014

(86) PCT No.: PCT/JP2014/081571
§ 371 (c)(1),
(2) Date: Mar. 8, 2017

(87) PCT Pub. No.: WO2016/084231
PCT Pub. Date: Jun. 2, 2016

(65) Prior Publication Data
US 2017/0300233 A1      Oct. 19, 2017

(51) Int. Cl.
*G06F 12/12* (2016.01)
*G06F 3/06* (2006.01)
(Continued)

(52) U.S. Cl.
CPC ............ *G06F 3/065* (2013.01); *G06F 3/0617* (2013.01); *G06F 3/0683* (2013.01);
(Continued)

(58) Field of Classification Search
CPC combination set(s) only.
See application file for complete search history.

(56) References Cited

U.S. PATENT DOCUMENTS 7,149,859 B2 * 12/2006 Fujibayashi .......... G06F 3/0607
                                                              711/162
7,415,589 B2 *  8/2008 Hirakawa ........... G06F 11/2058
                                                              707/999.202
(Continued)

FOREIGN PATENT DOCUMENTS

JP      2010-020410 A       1/2010
JP      2011-076130 A       4/2011

OTHER PUBLICATIONS

International Search Report of PCT/JP2014/081571 dated Feb. 17, 2015.

*Primary Examiner* — Midys Rojas
*Assistant Examiner* — Khoa D Doan
(74) *Attorney, Agent, or Firm* — Mattingly & Malur, PC

(57) ABSTRACT

A storage system forms a high availability pair for data duplication using a first volume of a first storage apparatus as a primary volume and a second volume of a second storage apparatus as a secondary volume. The first volume and a third volume of a third storage apparatus are used as a primary volume and a secondary volume, respectively, to form an asynchronous copy pair. The second volume and the third volume are used as a primary volume and a secondary volume, respectively, to form a standby pair. When a command to form the asynchronous copy pair is received, the storage system refuses to form the asynchronous copy pair when the standby pair is not formed yet.

14 Claims, 27 Drawing Sheets

(51) Int. Cl.
*G06F 11/14* (2006.01)
*G06F 11/16* (2006.01)

(52) U.S. Cl.
CPC ...... *G06F 11/1456* (2013.01); *G06F 11/1658* (2013.01); *G06F 11/1458* (2013.01)

(56) References Cited

U.S. PATENT DOCUMENTS

| | | | | |
|---|---|---|---|---|
| 7,464,236 B2* | 12/2008 | Sano | ............ | G06F 11/2058 707/999.202 |
| 7,640,411 B2* | 12/2009 | Ito | ............ | G06F 11/2074 707/999.202 |
| 7,739,540 B2* | 6/2010 | Akutsu | ............ | G06F 11/2058 714/3 |
| 7,809,907 B2* | 10/2010 | Uratani | ............ | G06F 11/2071 707/639 |
| 7,818,522 B2* | 10/2010 | Bartfai | ............ | G06F 11/2082 711/162 |
| 8,271,438 B2* | 9/2012 | Takahashi | ............ | G06F 11/2058 707/613 |
| 8,589,616 B2* | 11/2013 | Miwa | ............ | G06F 3/0617 711/170 |
| 2004/0260899 A1* | 12/2004 | Kern | ............ | G06F 11/2058 711/162 |
| 2005/0038968 A1* | 2/2005 | Iwamura | ............ | G06F 11/2058 711/162 |
| 2009/0094403 A1 | 4/2009 | Nakagawa et al. | | |
| 2010/0011179 A1* | 1/2010 | Sano | ............ | G06F 11/2069 711/162 |
| 2011/0078396 A1 | 3/2011 | Hiraiwa et al. | | |
| 2013/0124915 A1 | 5/2013 | Sano et al. | | |
| 2014/0351538 A1* | 11/2014 | Kono | ............ | G06F 3/0647 711/162 |
| 2016/0006668 A1* | 1/2016 | Shibayama | ............ | H04L 47/78 709/226 |
| 2016/0342490 A1* | 11/2016 | Deguchi | ............ | G06F 11/2058 |

* cited by examiner

FIG. 9

HA PAIR MANAGEMENT TABLE 400

| HA PAIR ID 401 | OWN VOLUME ID 402 | OWN VOLUME ATTRIBUTE 403 | PARTNER VOLUME ID 404 | PARTNER APPARATUS ID 405 | PARTNER VOLUME ATTRIBUTE 406 | PAIR STATE 407 | HA GROUP ID 408 |
|---|---|---|---|---|---|---|---|
| HAPAIR01 | VOL11 | PRIMARY | VOL21 | DKC02 | SECONDARY | PAIR | HAG01 |
| ... | ... | ... | ... | ... | ... | ... | ... |

FIG. 10

RC PAIR MANAGEMENT TABLE 500

| PAIR ID 501 | OWN VOLUME ID 502 | OWN VOLUME ATTRIBUTE 503 | OWN JOURNAL GROUP ID 504 | PARTNER VOLUME ID 505 | PARTNER APPARATUS ID 506 | PARTNER VOLUME ATTRIBUTE 507 | PARTNER JOURNAL GROUP ID 508 | PAIR STATE 509 | DELTA OPTION 510 | RC GROUP ID 511 |
|---|---|---|---|---|---|---|---|---|---|---|
| RCPAIR01 | VOL01 | PRIMARY | JNLG11 | VOL31 | DKC03 | SECONDARY | JNLG31 | PAIR | - | RCG01 |
| ... | ... | ... | ... | ... | ... | ... | ... | ... | ... | ... |

FIG. 11

JOURNAL GROUP MANAGEMENT TABLE 600

| OWN GROUP ID 601 | OWN GROUP ATTRIBUTE 602 | OWN GROUP STATE 603 | GROUP REGISTERED VOLUMES 604 | PARTNER GROUP ID 605 | PARTNER APPARATUS ID 606 | JOURNAL CREATION SEQUENTIAL NUMBER 607 | PURGE SEQUENTIAL NUMBER 608 |
|---|---|---|---|---|---|---|---|
| JNLG11 | PRIMARY | STARTED | VOL01. VOL02. VOL03. | JNLG31 | DKC03 | SN5023 | SN2031 |
| ... | ... | ... | ... | ... | ... | ... | ... |

STORAGE SYSTEM

BACKGROUND

This invention relates to a storage system.

Storage systems are demanded to have a high availability (HA) function, which is provided by giving a storage apparatus a cluster configuration. With the HA function, a storage system attains high availability. An HA configuration has double systems and, when a failure occurs in one of the systems, automatically cuts off the failed system to continue operating using the normal system alone. The HA function further accomplishes full use of resources and load balancing by running two systems as active systems.

In order to maintain consistency between the systems of the HA configuration, volumes of the double systems are synchronized with each other. A pair of a volume belonging to one system and a volume belonging to the other system is called an HA pair. Writing in write processing is completed only after data is written in the two volumes. It therefore takes long to respond to a host.

The distance between the volumes of an HA pair may be set relatively short in a business operation that places importance on response performance. In this case, both of two storage apparatus may be rendered unusable when a disaster affecting a wide area occurs. Another issue is that data safety drops when a failure occurs in one of the systems of the HA configuration and the normal system continues operating alone. Data safety can be enhanced by creating a backup in a distant data center through remote copying.

Patent Literature 1 can be given as background art for attaining high availability of a storage system. In Abstract of Patent Literature 1, there is a disclosure that: "The same virtual identifier is set for volume 1A of a first storage unit 1 and for a volume 2A of a second storage unit 2. A path control unit 5B of a host 5 identifies the volumes 1A and 2A, which have the same virtual identifier, as one virtual volume 6. A remote copy pair can also be set by a virtual volume 6 and a volume 3A of a third storage unit 3."

In Patent Literature 1, when a failure occurs in the first storage unit, failover from the first storage unit to the second storage unit is executed to continue the business operation. After the second storage unit starts running, an update to data in the second storage unit is reflected in the third storage unit by remote copy. This enables the third storage unit to take over the business operation of the second storage unit if a further failure occurs in the second storage unit.

Patent Literature 1: US 2009/0094403 A1

SUMMARY

In Patent Literature 1, the volume 1A and the volume 2A form a first copy pair, and the volume 1A and the volume 3A form a second copy pair. There is another possible pair configuration in which a third copy pair formed by the volume 2A and the volume 3A is added to the pair configuration of Patent Literature 1. The inventors of this invention have found that the order in which copy pairs are formed is important when three copy pairs are respectively copy pairs of particular types.

Specifically, a case where the first copy pair is an HA pair, the second copy pair is an asynchronous copy pair, and the third copy pair is a standby pair for a failure in the volume 1A is discussed.

The standby pair in a normal pair state holds update data of the volume 2A in a journal volume, and the update data is not reflected in the volume 3A. When a failure occurs in the volume 1A, the data in the journal volume is reflected in the volume 3A, and the volume 2A and the volume 3A form an asynchronous copy pair.

In the case where the copy pairs in the copy pair configuration described above are formed in a particular order, there is a chance that not all of update data of the volumes 1A and 2A is reflected in the volume 3, resulting in a failure to ensure data consistency between the volume 2A and the volume 3A.

A representative example of this invention is A storage system, including a first storage apparatus, a second storage apparatus, and a third storage apparatus, the first storage apparatus and the second storage apparatus comprising a first volume and a second volume, respectively, the first volume being used as a primary volume, the second volume being used as a secondary volume, the first volume and the second volume forming a high availability pair for data duplication, the third storage apparatus comprising a third volume, the first volume and the third volume being used as a primary volume and a secondary volume, respectively, to form an asynchronous copy pair in which data written to one of the first volume and the second volume is copied asynchronously from the first volume to the third volume, the second volume and the third volume being used as a primary volume and a secondary volume, respectively, to form a standby pair in which, when a failure occurs in the first volume, data written to the second volume is copied asynchronously from the second volume to the third volume, wherein, when a command to form the asynchronous copy pair is received, the storage system refuses to form the asynchronous copy pair when the standby pair is not formed yet According to one embodiment of this invention, in a copy pair configuration where three volumes form three particular copy pairs, consistency can be maintained between two volumes that continue to be in use when a failure occurs in one of the volumes.

BRIEF DESCRIPTION OF THE DRAWINGS

FIG. 8B depicts processing executed when the second storage apparatus receives from the host computer 10 a request to write to the volume is illustrated in.

FIG. 9 depicts an example of an HA pair management table.

FIG. 10 depicts an example of an RC pair management table.

FIG. 11 depicts an example of a journal group management table.

DETAILED DESCRIPTION OF THE EMBODIMENTS

Embodiments of this invention are described below with reference to the accompanying drawings. It should be noted that the embodiments described below are merely examples for realizing this invention and do not limit a technical scope of this invention. Components common across the respective drawings are denoted by the same reference symbols.

A component that is not explicitly qualified as "virtual" in the following description is a real component unless otherwise noted. In the following description, a volume that stores host data may be referred to as "data volume" or simply "volume", and a volume that stores a journal may be referred to as "journal volume".

Figure 1A:
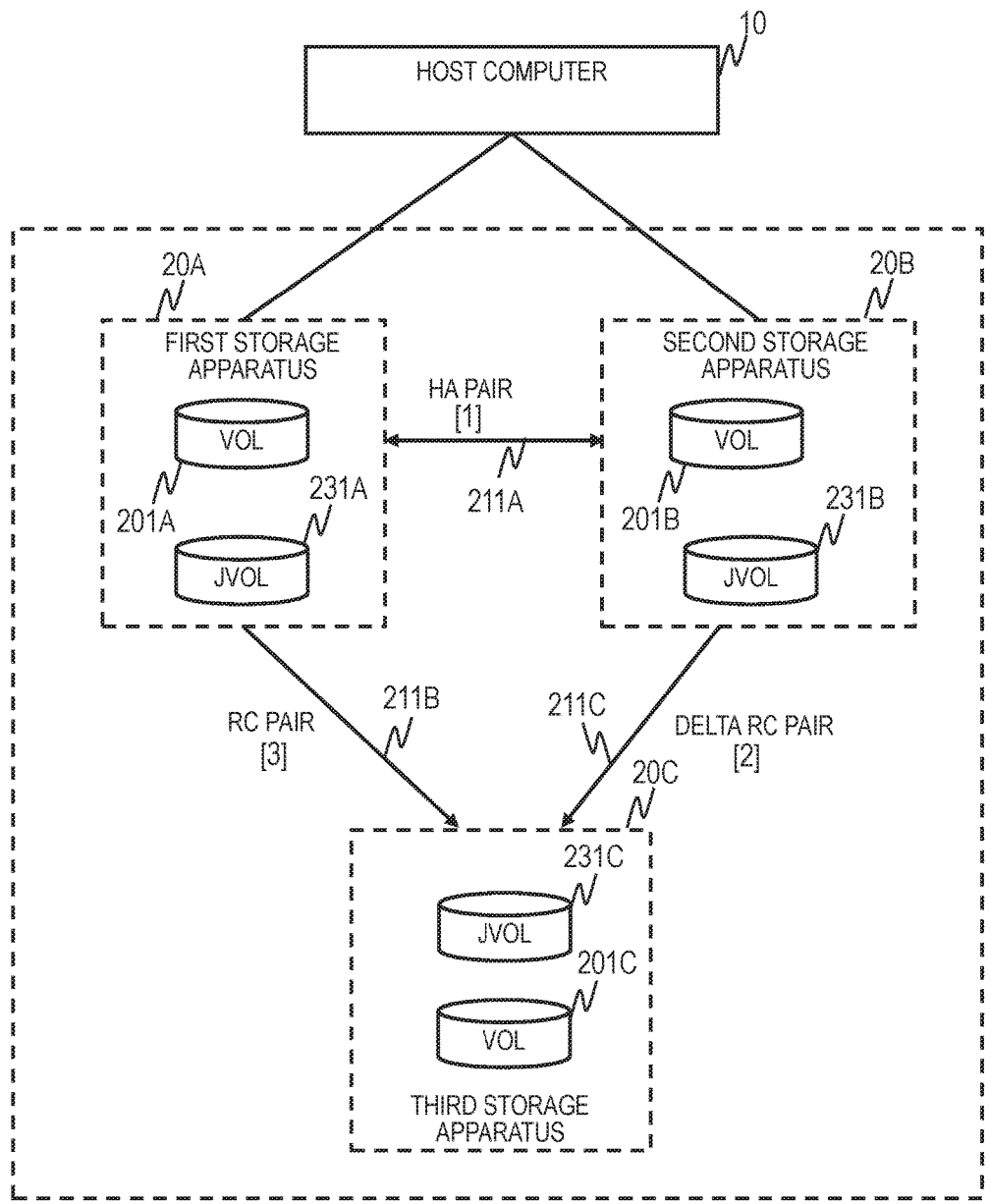
FIG. 1A depicts the outline of an embodiment.

The embodiment is outlined in FIG. 1A. A storage system includes a first storage apparatus 20A, a second storage apparatus 20B, and a third storage apparatus 20C, which are coupled to one another by a network. The first storage apparatus 20A provides a first volume 201A, the second storage apparatus 20B provides a second volume 201B, and the third storage apparatus 20C provides a third volume 201C.

The storage apparatus 20A to 20C keep journal volumes (JVOLs) 231A to 231C, respectively. A JVOL stores a journal. A journal is made up of write data (also referred to as "update data") and update information. The update information includes the address of the update data and an update number, which indicates a place in update order.

The first volume 201A and the second volume 201B form a high availability pair (HA pair) 211A. The first volume 201A and the third volume 201C form a remote copy pair (RC pair) 211B. The second volume 201B and the third volume 201C form a delta remote copy pair (delta RC pair) 211C.

Copy pairs that share one volume in the manner described above are referred to as "coordinated copy pairs". The HA pair 211A, the RC pair 211B, and the delta RC pair 211C are coordinated copy pairs with respect to one another.

The storage system forms a copy pair by following a command from a host computer 10 or from a management computer (not shown). Through the forming of a copy pair, the storage system defines a copy relation between two volumes and manages information of the copy relation. Initial copy from one volume to the other volume is executed after the copy pair is formed. The storage system may allow a user to specify when the initial copy is executed. Copy pairs in the storage system of this embodiment, that is, the HA pair 211A, the delta RC pair 211C, and the RC pair 211B, are formed in the order stated. This ensures that, when a failure occurs in the first volume 201A, an update that is made to the HA pair after the RC pair is formed is reflected in the third volume 201C by journal copy. The operation of the respective copy pairs is described first.

The HA pair 211A is a synchronous copy pair and, after write data is written in both of the volume 201A and the volume 201B, a completion report is returned to the host. The first volume 201A is a primary volume (PVOL) and the second volume 201B is a secondary volume (SVOL). The PVOL in the HA pair may be referred to as "HAPVOL", and the SVOL in the HA pair may be referred to as "HASVOL". The HAPVOL 201A and the HASVOL 201B both receive a read request and a write request from the host. In the case where a failure occurs in one of the volumes of the HA pair, the other volume alone remains in use.

Write data is always written first to the HAPVOL 201A. The second storage apparatus 20B responds to a write request issued to the HASVOL 201B by transferring write data to the first storage apparatus 20. The write data is written to the HAPVOL 201A and then to the HASVOL 201B. Read data is read out of the HAPVOL 201A and the HASVOL 201B both, or out of the HAPVOL 201A alone.

The RC pair 211B is an asynchronous copy pair, with the first volume 201A serving as the PVOL and the third volume 201C serving as the SVOL. The PVOL in the RC pair may be referred to as "RCPVOL", and the SVOL in the RC pair may be referred to as "RCPVOL". The first volume 201A is the RCPVOL as well as being the HAPVOL.

The first storage apparatus 20A stores in the primary journal volume (PJVOL) 231A a journal of write data that the RCPVOL 201A stores. The RC pair 211B is an asynchronous remote copy pair, and a completion report of the RC pair 211B is transmitted in response to the storing of write data in the RCPVOL 201A. The first storage apparatus 20A transmits the journal to the third storage apparatus 20C.

The third storage apparatus 20C stores the journal from the PJVOL 231A in the secondary journal volume (SJVOL) 231C, and then stores update data of this journal in the RCSVOL 201C. The update number is used to match the update order of the RCPVOL 201A and the update order of the RCSVOL 201C.

The delta RC pair 211C is a standby copy pair that is formed in anticipation of a failure in the first volume 201A, with the second volume 201B serving as the PVOL and the third volume 201C serving as the SVOL. The PVOL in the delta RC pair may be referred to as "delta RCPVOL", and the SVOL in the delta RC pair may be referred to as "delta RCSVOL". The second volume 201B is the delta RCPVOL as well as being the HASVOL. The third volume 201C is the delta RCSVOL as well as being the RCSVOL.

A journal of update data of the delta RCPVOL 201B is stored and held in the PJVOL 231B of the second storage apparatus 20B. The normal state of the delta RC pair 211C is a standby state, and an update of the delta RCPVOL 201B is not reflected in the delta RCSVOL 201C. When a failure occurs in the first volume 201A, update data stored in the PJVOL 231B is reflected in the delta RCSVOL 201C (delta copy), and the delta RC pair 211C turns into an RC pair. The second volume 201B and the third volume 201C are now run as an RCPVOL and an RCSVOL, respectively.

The delta RC pair 211C enters a standby state as soon as the pair is formed. No data copying, including initial copy, is executed in the delta RC pair 211C until a delta resync command, which is described later, is issued. A journal of update data of the delta RCPVOL 201B is not created even after the delta RC pair 211C is formed, until the RC pair 211B is formed and update data is propagated in the RC pair 211B.

Figure 1B:
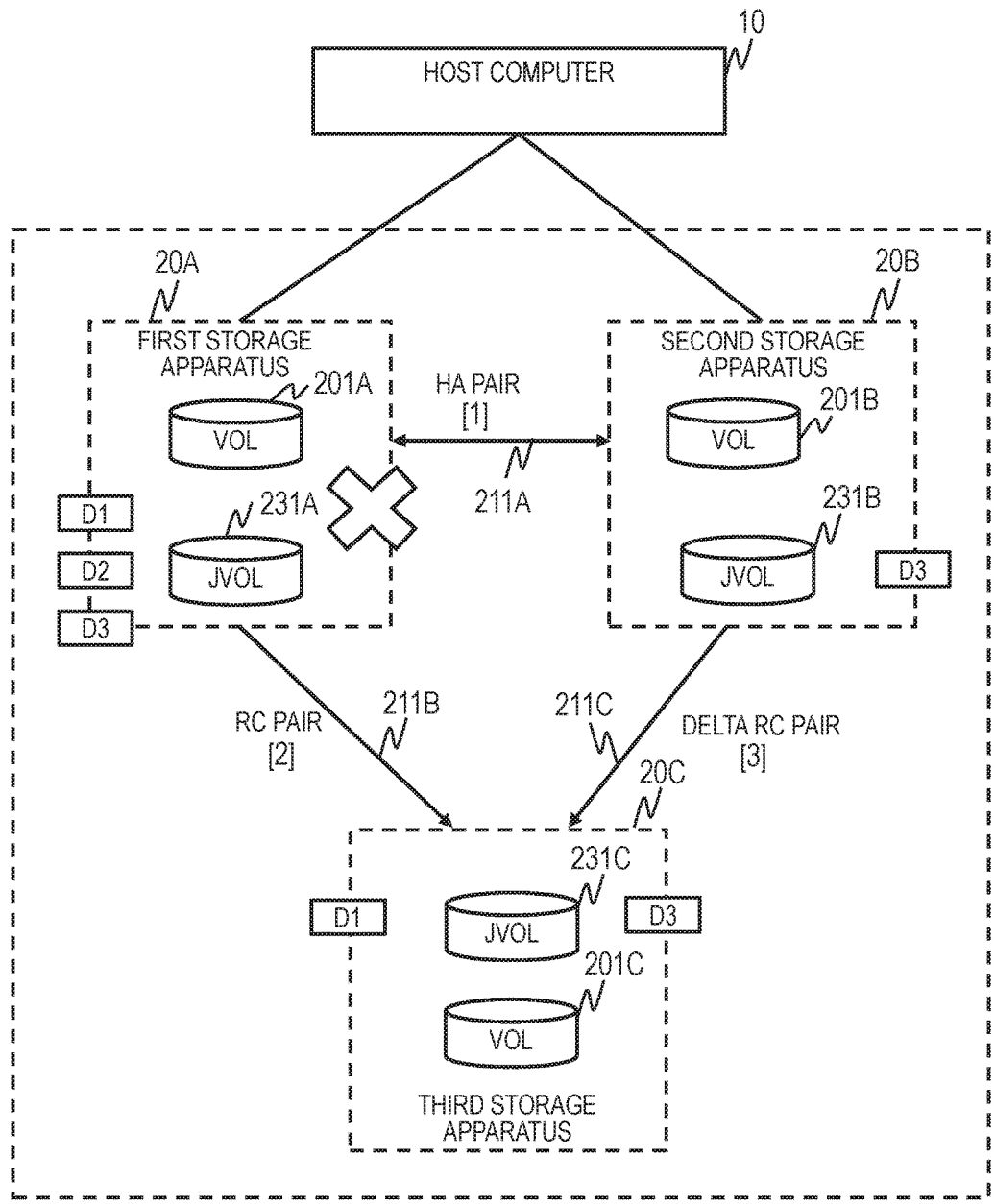
FIG. 1B depicts an issue that arises when copy pairs are formed in an order different from the one in FIG. 1A.

An issue that arises when the copy pairs are formed in an order different from the one in FIG. 1A is illustrated in FIG. 1B. In FIG. 1B, the copy pairs, that is, the HA pair 211A, the RC pair 211B, and the delta RC pair 211C, are formed in the stated order. A journal of the RCPVOL 201B is created before the delta RC pair 211C is formed.

The RC pair 211B is formed after the HA pair 211A is formed. At the time when the RC pair 211B is formed, the JVOLs 231A and 231C are associated with the RC pair 211B. Initial copy from the PVOL to the SVOL is executed when the HA pair 211A and the RC pair 211B are formed. Initial copy in the RC pair 211B may be optional. Thereafter, update data D1 and update data D2 are written in the PJVOL 231A.

The delta RC pair 211C is then formed. At the time when the delta RC pair 211C is formed, the JVOL 231B is associated with the delta RC pair 211C. Update data starts to be stored in the JVOL 231B after the delta RC pair 211C is formed.

Update data D3 is written in the PJVOL 231A and the PJVOL 231B after the delta RC pair 211C is formed. The update data D1 is transferred to the SJVOL 231C by asynchronous copy. A failure occurs in the first volume 201A before the update data D2 is transferred to the SJVOL 231C.

At the time of failure, only the update data D1 is stored in the SJVOL 231C of the third storage apparatus 20C and only the update data D3 is stored in the PJVOL 231B of the second storage apparatus 20B. The update data D2 is not stored in the SJVOL 231C and the PJVOL 231B, and therefore cannot be copied to the third volume 201C.

Figure 1C:
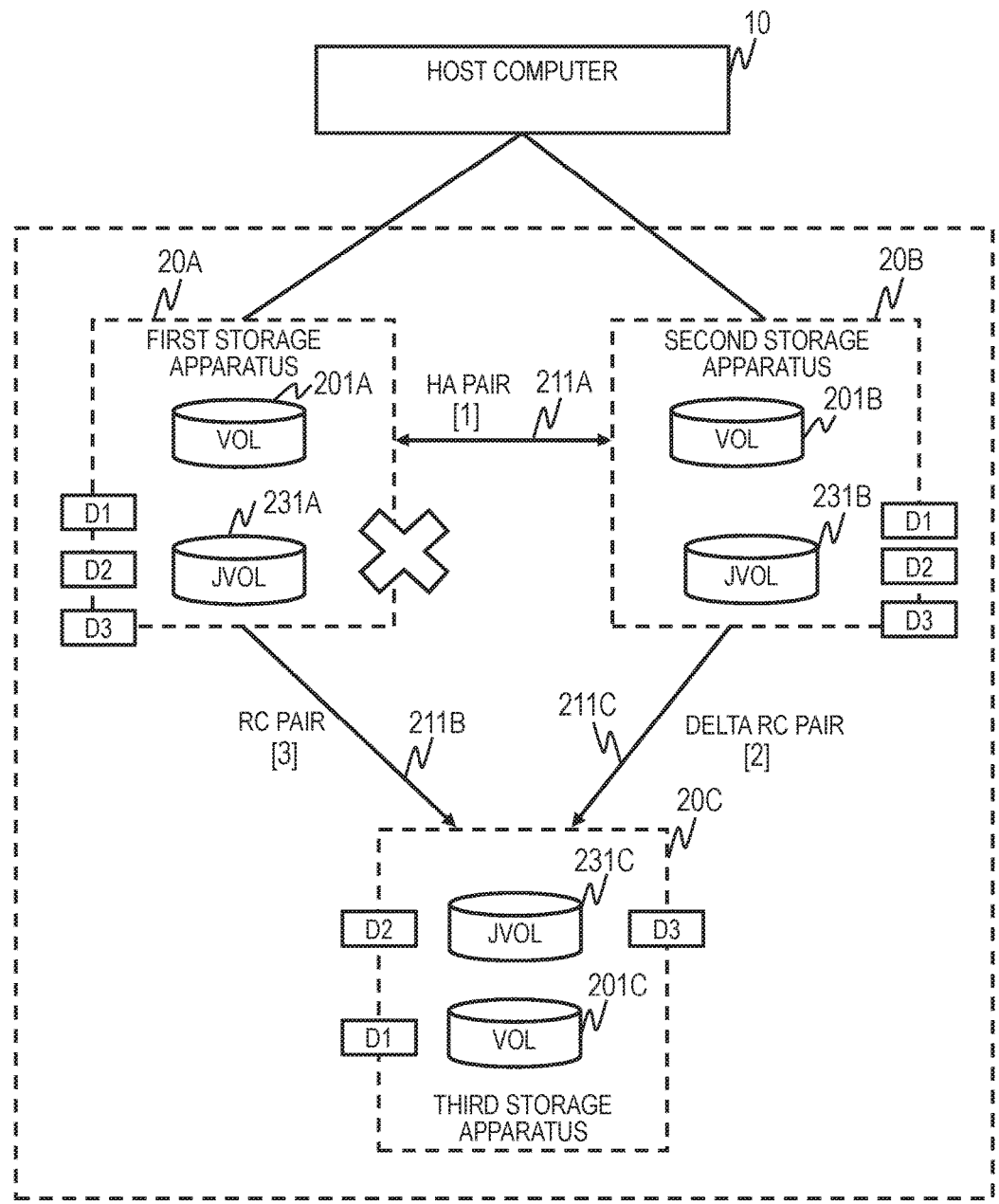
FIG. 1C depicts delta copy in the case where the copy pairs are formed in the order of FIG. 1A.

Delta copy in the case where the copy pairs are formed in the order of FIG. 1A is illustrated in FIG. 1C. The HA pair 211A is formed first. The HA pair 211A is formed first because the RC pair 211B and the delta RC pair 211C are pairs for backup copying of the HA pair 211A. Initial copy is as described above.

The delta RC pair 211C is formed next and then the RC pair 211B is formed. After the RC pair 211B is formed, the update data D1 to the update data D3 are stored in the HA pair 211A and the PJVOLs 231A and 231B in order.

A failure occurs in the first volume 201A after the update data D1 and the update data D2 are transferred to the SJVOL 231C of the RC pair 211B. The update data D3 is not transferred to the SJVOL 231C at the time of failure. However, the update data D3 is stored in the PJVOL 231B of the delta RC pair 211C, and can therefore be copied to the third volume 201C. The copy pair forming order of this embodiment ensures that update data generated after the RC pair 211B is formed is reflected in the third volume 201C by journal copy of the delta RC pair 211C. Data consistency of the delta RC pair 211C is secured by initial copy of the RC pair 211B.

Figure 2:
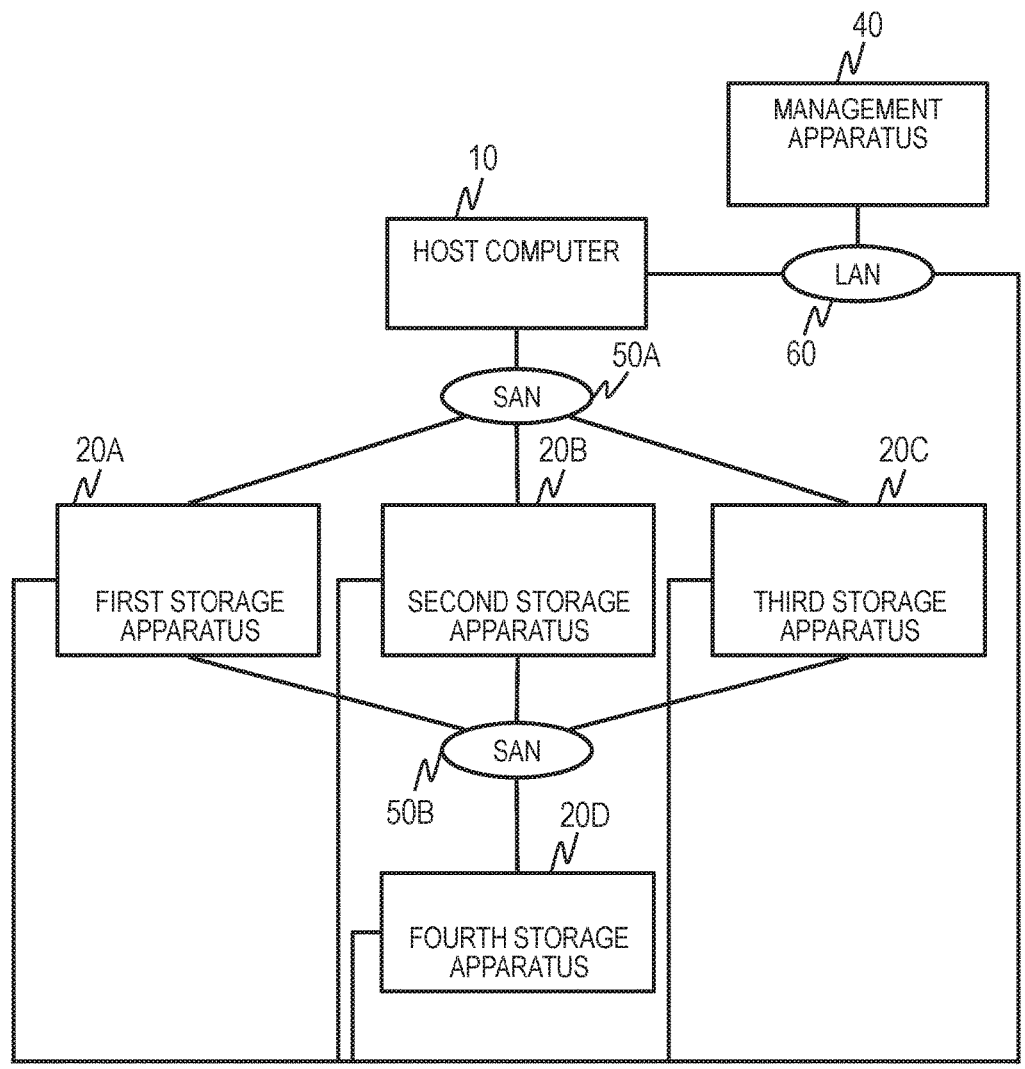
FIG. 2 depicts an example of the configuration of a computer system in this embodiment.

An example of the configuration of a computer system in this embodiment is illustrated in FIG. 2. The computer system of FIG. 2 includes a host computer 10, storage apparatus 20A to 20D, and a management apparatus 40. The storage apparatus 20A to 20D and the management apparatus 40 are included in a storage system.

The number of apparatus (systems) included in the computer system varies depending on design. The first storage apparatus 20A and the second storage apparatus 20B serve as one virtual storage apparatus. Volumes provided by the first storage apparatus 20A and the second storage apparatus 20B form an HA pair.

The third storage apparatus 20C stores backup data of the first storage apparatus 20A and the second storage apparatus 20B. Volumes provided by the first storage apparatus 20A and the third storage apparatus 20C form an RC pair. Volumes provided by the second storage apparatus 20B and the third storage apparatus 20C form a delta RC pair.

The fourth physical storage apparatus 20D includes a quorum disk. The quorum disk provides a function of determining which one of the first storage apparatus 20A and the second storage apparatus 20B, which form an HA configuration, is to continue running and which one of the two is to stop when communication cannot be held between the first storage apparatus 20A and the second storage apparatus 20B of the HA configuration. The quorum disk prevents a split brain problem.

The host computer 10, the management apparatus 40, and the storage apparatus 20A to 20D are coupled to one another by a management network 60, which includes a LAN, in a manner that allows communication between the components. The management network 60 is an IP network, for example. The management network 60 can be a network of any type as long as the network is suitable for management data communication.

The host computer 10 and the storage apparatus 20A to 20D are coupled to each other by a data network 50A, which includes a storage area network (SAN). The storage apparatus 20A to 20D are coupled to one another by an inter-storage data network 50B, which includes a SAN.

The host computer 10 accesses volumes of the storage apparatus 20A to 20C via the SAN 50A. The data networks 50A and 50B can be networks of any type as long as the networks are suitable for data communication. The data networks 50A and 50B and the management network 60 may be the same network.

Figure 3:
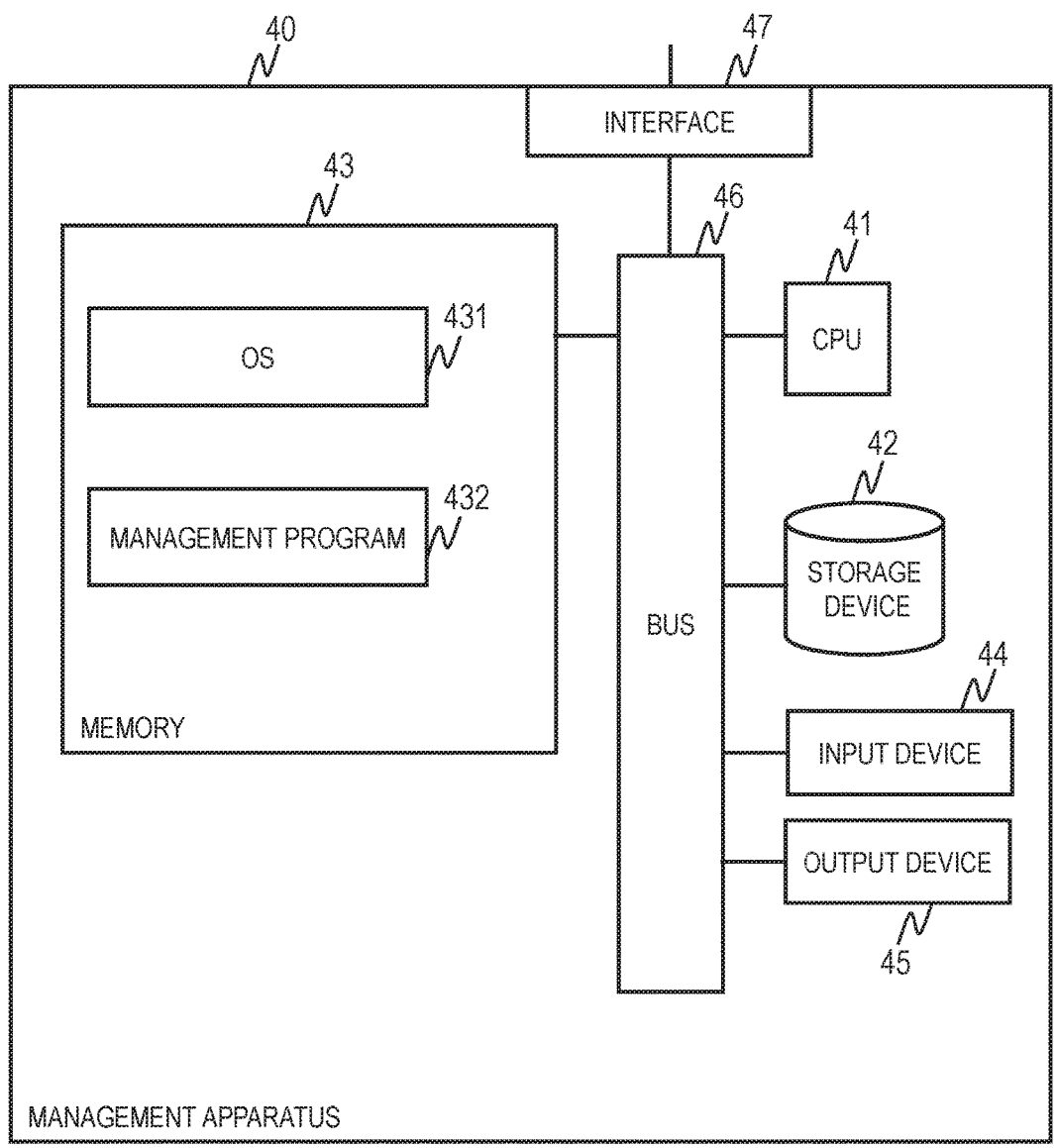
FIG. 3 depicts schematically an example of the configuration of the management apparatus.

An example of the configuration of the management apparatus 40 is schematically illustrated in FIG. 3. The management apparatus 40 includes a central processing unit (CPU) 41, which is a processor, a non-volatile secondary storage device 42, a memory 43, which is a main storage device, an input device 44, an output device 45, and a management interface 47. The components are coupled to one another by a bus 46 in a manner that allows communication between the components. The input device 44 is, for example, a keyboard and a mouse, and the output device 45 is, for example, a display and a printer.

The CPU 41 operates as programmed by a program that is stored in the memory 43. Typically, a program and data stored in the secondary storage device 42 are loaded onto the memory 43. The memory 43 in this example holds an operating system (OS) 431 and a management program 432. The interface 47 exchanges management data and control requests with the storage apparatus 20A to 20D via the LAN 60. The management interface 47 also exchanges management data and control requests with the host computer 10 via the LAN 60.

The host computer 10 includes a port that couples to the SAN 50A in addition to the hardware configuration of the management apparatus 40. The host computer 10 exchanges R/W commands and data with the storage apparatus by communication via this port. The host computer 10 exchanges management data and control requests with other apparatus via the management interface and the LAN 60.

The host computer 10 holds an alternate path program and an application program in addition to an OS. The application program executes data read and data write in volumes provided by the storage apparatus 20A to 20D. The alternate path program selects a path (port) through which a volume is accessed.

Figure 4:
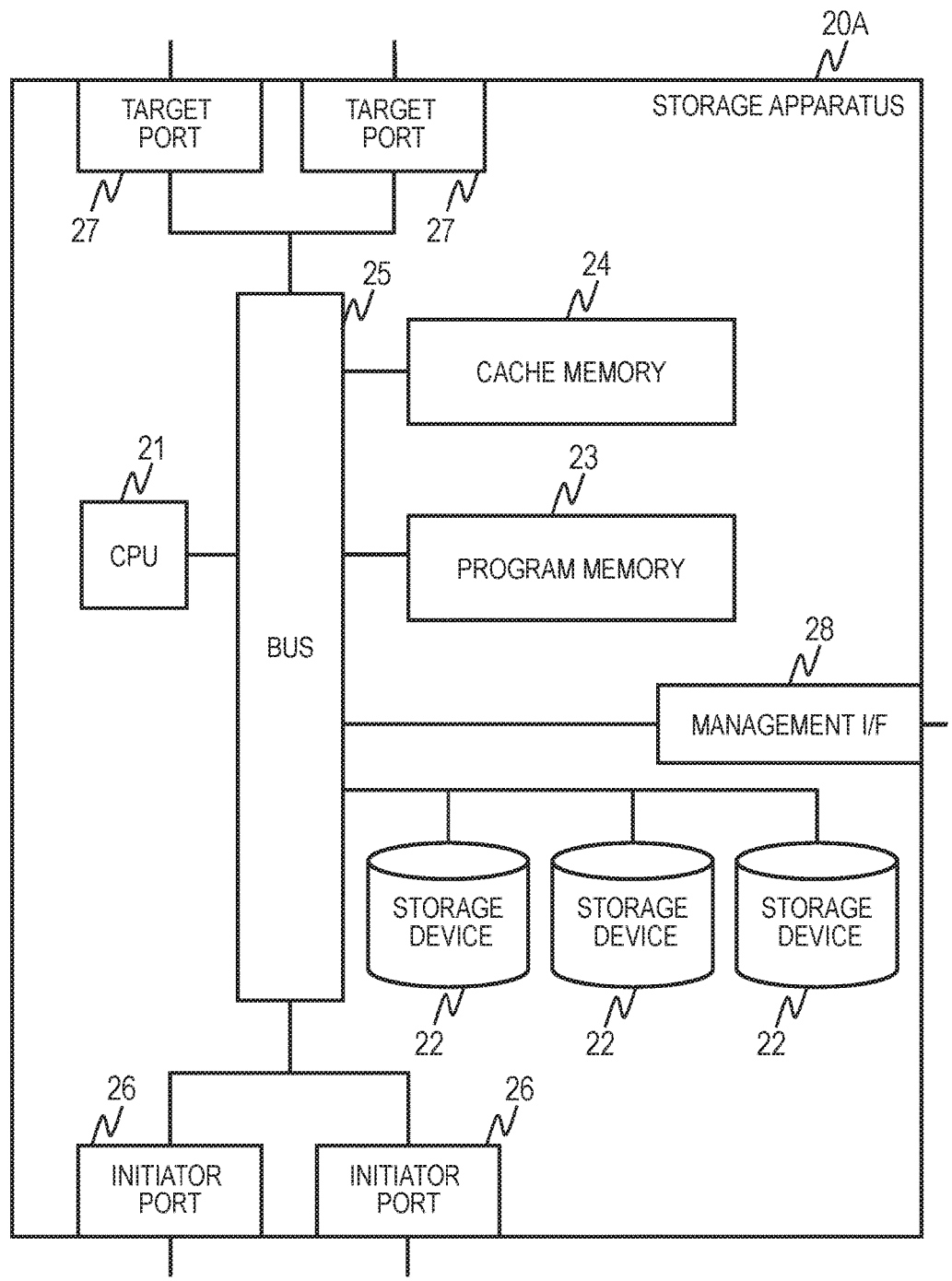
FIG. 4 depicts schematically an example of the configuration of the first storage apparatus.

An example of the configuration of the first storage apparatus 20A is schematically illustrated in FIG. 4. In this example, the storage apparatus 20A to 20D all have the same basic configuration, but vary in the number of components, storage capacity, and the like. In that regard, the storage apparatus 20A to 20D may have different basic configurations from one another.

The first storage apparatus 20A includes a plurality of storage devices (for example, hard disk drives and/or solid state drives (SSDs)) 22 and a storage controller configured to control the first storage apparatus 20A for volume management and for communication to/from the host computer 10 or other storage apparatus.

The storage controller includes a CPU 21, which is a processor, a program memory 23, initiator ports 26, which are I/O request issuing-side interfaces, target ports 27, which are I/O request receiving-side interfaces, a management interface 28, and a cache memory 24, which is for data transfer. The components are coupled to one another by a bus 25 in a manner that allows communication between the components.

The initiator ports 26 couple to the SAN 50B. The first storage apparatus 20A couples to external (other) storage apparatus via the initiator ports 26 to transmit I/O requests and write data to the external storage apparatus, and to receive read data from the external storage apparatus.

The target ports 27 couple to the SAN 50A or 50B. Via the target ports 27, the first storage apparatus 20A receives I/O requests and write data from the host computer 10 or external storage apparatus, and transmits read data to the host computer 10 or the external storage apparatus. The management interface 28 is a device configured to couple the first storage apparatus 20A to the LAN 60.

The CPU 21 is configured to execute a program for controlling the first storage apparatus 20A to implement given functions, which include the control of I/O to/from the host computer 10 and the management and control of volumes. At least some of the functions implemented by the CPU 21 that are described in this embodiment may be implemented by a logic circuit that is not the CPU 21.

A program executes predetermined processing with the use of a memory and an interface by being run by a processor (CPU). A description that has a program as the subject in this disclosure can therefore be read as a description that has a processor as the subject. In other words, processing executed by a program is processing executed by an apparatus (for example, a storage apparatus or a host computer) and a system where the program is run.

The program memory 23 stores data and a program that the CPU 21 handles. The data of the program memory 23 is loaded onto the program memory 23 from a storage device that includes a non-transitory storage medium, for example, one of the storage devices 22 in the first storage apparatus 20A, a flash memory (not shown), or other apparatus coupled to the first storage apparatus 20A via the LAN 60.

Figure 5:
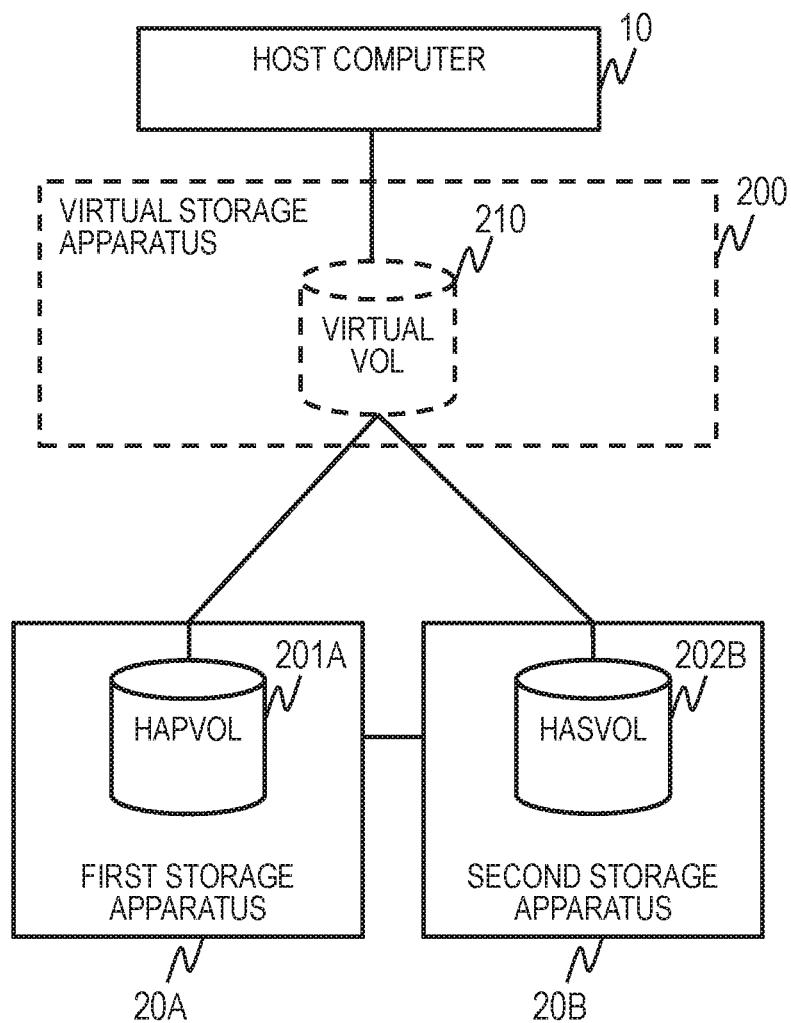
FIG. 5 depicts a virtual storage apparatus and a virtual volume that are provided by the HA configuration.

The HA configuration is described below. A virtual storage apparatus and a virtual volume that are provided by the HA configuration are illustrated in FIG. 5. The HA configuration and the HA pair in the following description are an active-active type HA configuration and HA pair. The HA pair is formed from an HAPVOL and an HAPVOL. In the example of FIG. 5, a volume 201A of the first storage apparatus 20A is the PVOL and a volume 201B of the second storage apparatus 20B is the SVOL.

The first storage apparatus 20A and the second storage apparatus 20B provide the same virtual storage apparatus ID to the host computer 10. The host computer 10 thus recognizes a virtual storage apparatus 200 instead of discriminating the first storage apparatus 20A and the second storage apparatus 20B from each other. Each storage apparatus holds an association relation between its own storage apparatus ID and a virtual storage apparatus ID. For example, each storage apparatus stores in its program memory 23 a mapping table in which a storage apparatus ID and a virtual storage apparatus ID are mapped.

A virtual volume 210 recognized by the host computer 10 is created from the volume 201A of the first storage apparatus 20A and the volume 201B of the second storage apparatus 20B to be managed as a double volume. Specifically, the virtual volume 210 is managed by associating the virtual volume ID of the virtual volume 210 with the ID of the volume 201A and the ID of the volume 201B. The storage apparatus 20A and 20B each hold an association relation between a virtual volume ID and a plurality of physical volume IDs that are associated with the virtual volume ID.

The host computer 10 recognizes a plurality of storage apparatus, here, 20A and 20B, as one virtual storage apparatus 200, and can access the virtual volume 210 in the same way as the host computer 10 can access a physical volume. Data written in one of the physical volumes via the virtual volume 210 is written in the other physical volume for the purpose of data duplication.

When a failure occurs in one of the physical volumes of the HA configuration, the volume redundancy function described above enables the host computer 10 to access data by using the other physical volume. The volume redundancy function also causes the host computer 10 to recognize, when data is migrated from an old physical storage apparatus to a new physical storage apparatus, the new storage apparatus as the same virtual storage apparatus that is associated with the old storage apparatus. A physical storage apparatus can thus be replaced without requiring the host computer to stop the business operation.

Figure 6A:
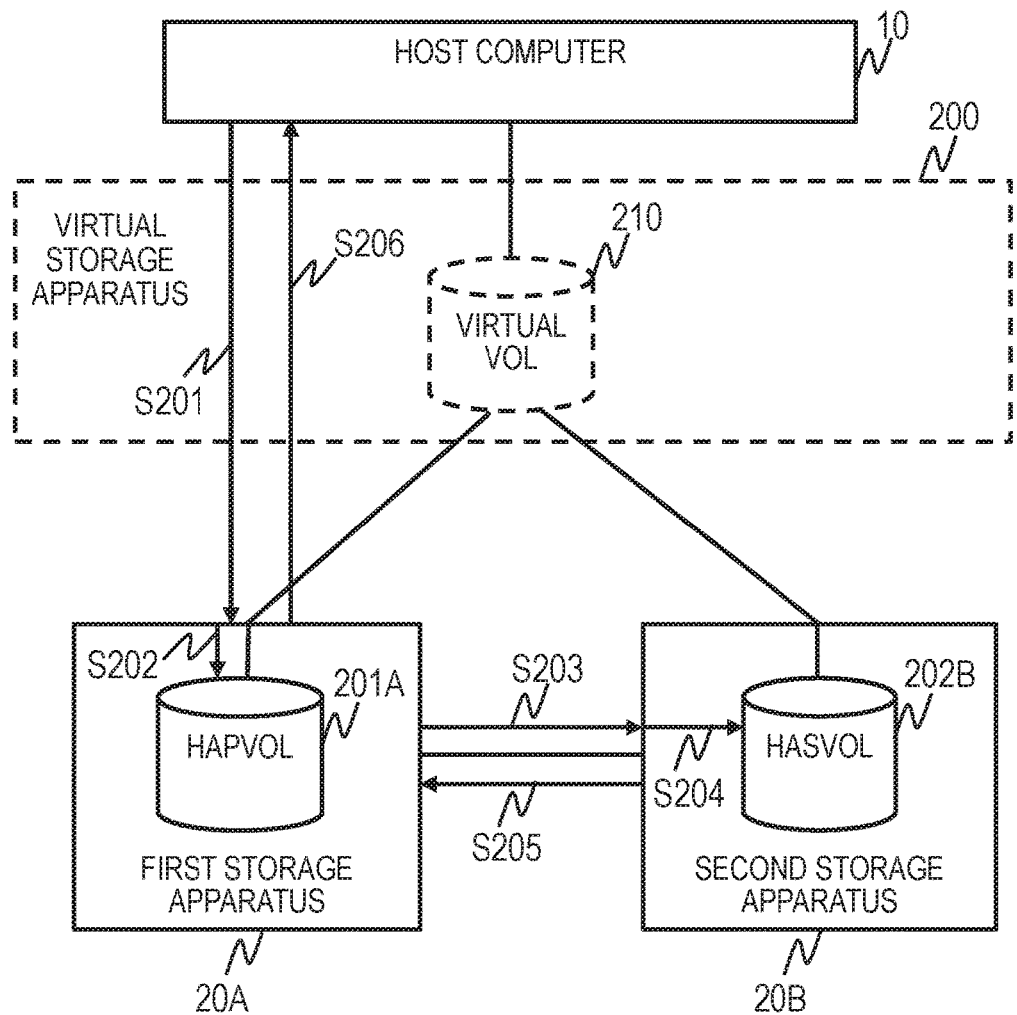
FIG. 6A depicts the outline of the flow of processing that is executed when a write request is issued to the HAPVOL from a host computer.

The flow of processing that is executed when a write request is issued to the HAPVOL 201A from the host computer 10 is outlined in FIG. 6A. The first storage apparatus 20A receives from the host computer 10 data that accompanies the write request (Step S201).

The first storage apparatus 20A obtains an exclusive lock on a write destination address in the volume 201A, and writes the data to the HAPVOL 201A (Step S202). In order to store the data in the HASVOL 201B, the first storage apparatus 20A transfers the write request and the data to the second storage apparatus 20B (Step S203).

The second storage apparatus 20B receives the write request and the data, and stores the data in the HASVOL 201B (Step S204). The second storage apparatus 20B transmits a write completion report to the first storage apparatus 20A (Step S205). The first storage apparatus 20A unlocks the exclusive lock obtained in Step S202, and transmits a write completion report to the host computer 10 (Step S206).

Figure 6B:
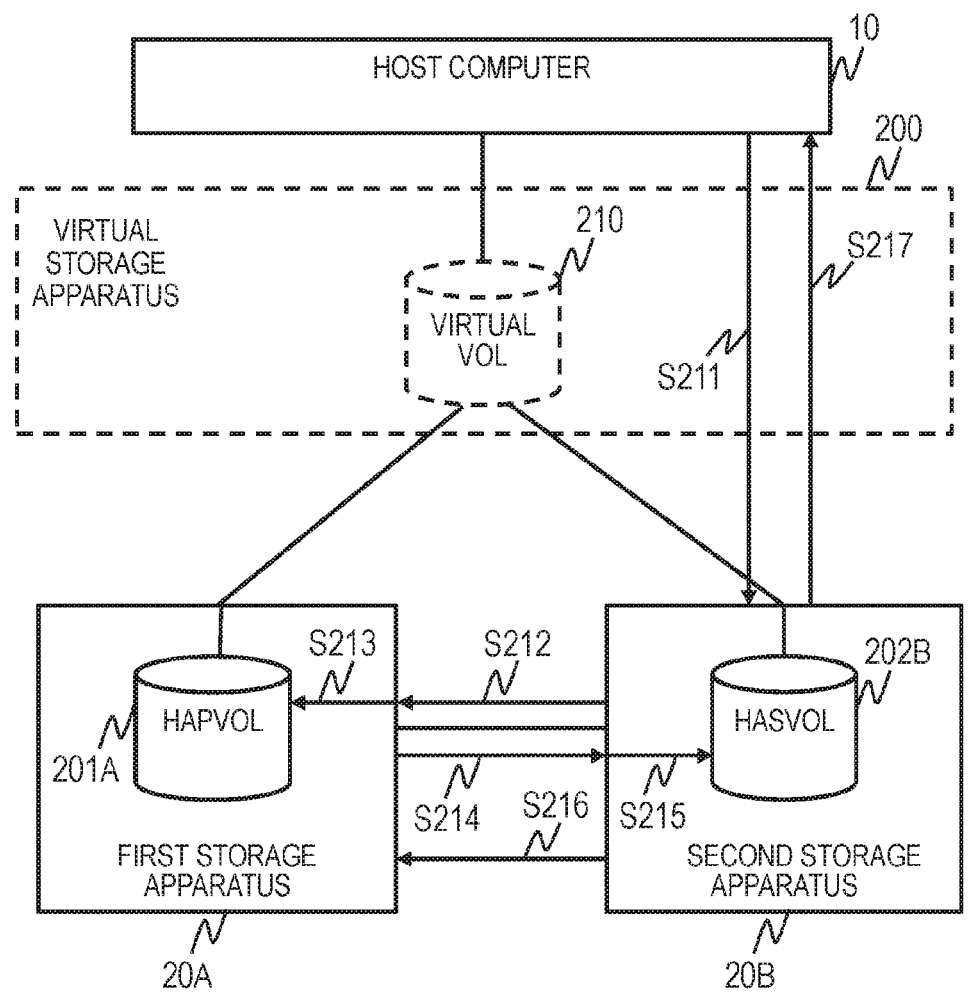
FIG. 6B depicts the outline of the flow of processing that is executed when a write request is issued to the HAPVOL from the host computer.

The flow of processing that is executed when a write request is issued to the volume 201B, which is the HASVOL, from the host computer 10 is outlined in FIG. 6B. The second storage apparatus 20B receives from the host computer 10 data that accompanies the write request (Step S211).

The second storage apparatus 20B transfers the write request and the data to the first storage apparatus 20A (Step S212). The first storage apparatus 20A receives the write request and the data, and stores the data in the volume 201A (Step S213). The first storage apparatus 20A transmits a write completion report to the second storage apparatus 20B (Step S214). The second storage apparatus 20B stores the data received from the host computer 10 in the volume 201B (Step S215), and instructs the first storage apparatus 20A to unlock an exclusive lock (Step S216). The second storage apparatus 20B then transmits a write completion report to the host computer 10 (Step S217).

The flow of processing that is executed when a read request is issued to the volume 201A and the volume 201B, which is the SVOL, is outlined. The second storage apparatus 20B receives the read request issued to the volume 201B, reads data out of the volume 201B, and returns the data to the host computer 10.

The first storage apparatus 20A receives the read request issued to the volume 201A, and checks whether an exclusive lock has been obtained on an area where data requested to be read is stored. When there is no exclusive lock on the area, the first storage apparatus 20A reads the data out of the volume 201A and returns the data to the host computer 10. In the case where an exclusive lock on the area has been obtained, the first storage apparatus 20A waits for a given period of time before checking again whether an exclusive lock has been obtained. An exclusive lock is obtained in processing of reading data out of the volume 201A.

In the example described above, an exclusive lock on an area in write processing prohibits any other write processing and read processing in the area, whereas an exclusive lock on an area in read processing prohibits write processing in the area and may or may not prohibit any other read processing in the area.

When I/O access to a volume of the HA pair is granted, irrespective of whether the volume to be accessed is the PVOL or the SVOL, it needs to be prevented that old data is read out after new data is read out. This is because, by reversing the order of reading, a rollback that leads to malfunction of the host may be caused. The writing order and exclusion control described above prevents the rollback and properly maintains consistency between the PVOL and the SVOL with respect to a command from the host.

The first storage apparatus 20A and the second storage apparatus 20B may use a volume access order and an exclusion control method different from those described above. For instance, data may always be read out of the SVOL in read processing.

Coordination between the HA configuration and remote copy is described next. In the storage system, RC pairs and delta RC pairs are formed in addition to HA pairs.

Figure 7:
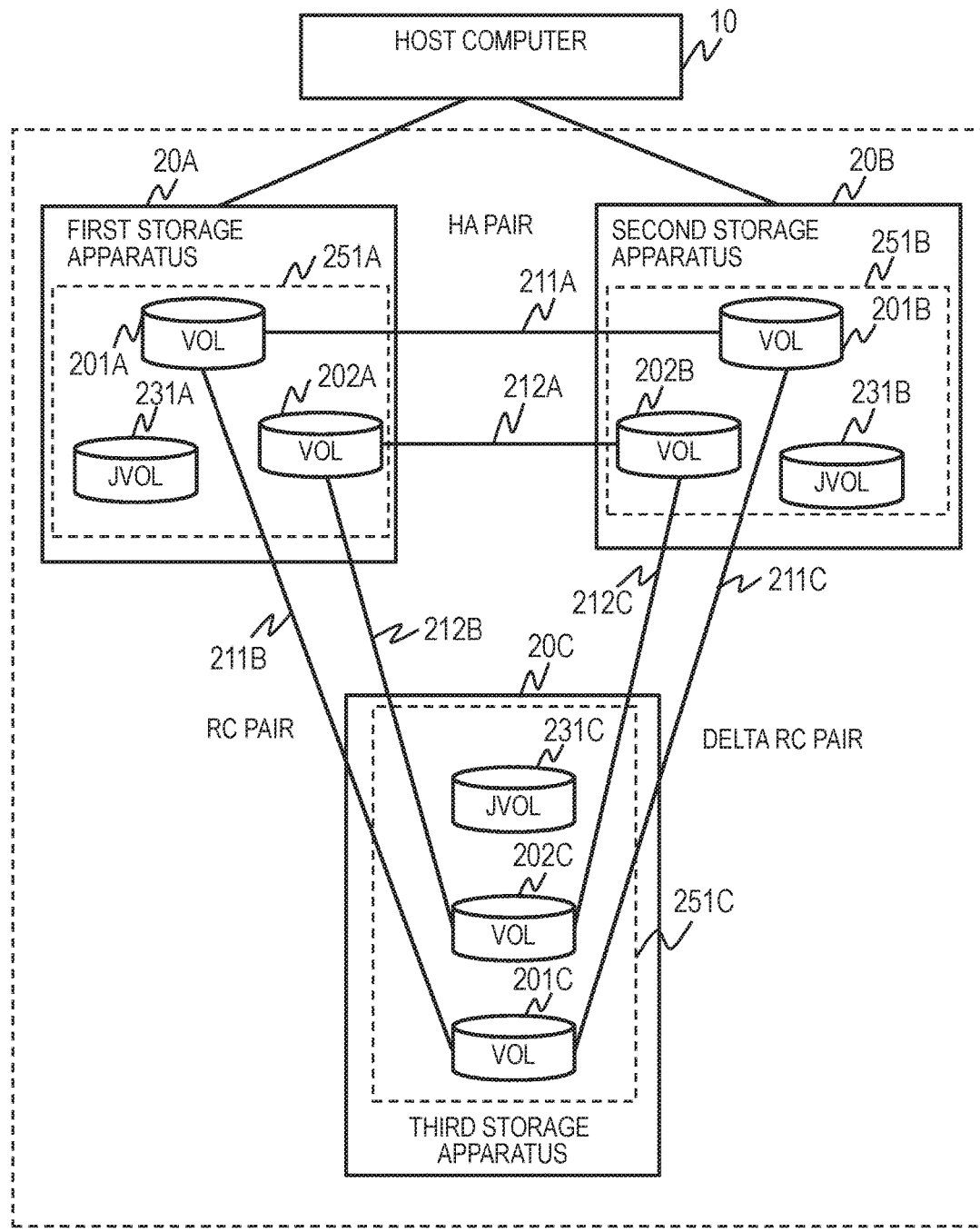
FIG. 7 depicts the volume pair configuration.

The volume pair configuration is illustrated in FIG. 7. The volume 201A of the first storage apparatus 20A and the volume 201B of the second storage apparatus 20B form the HA pair 211A as described above. A volume 202A of the first storage apparatus 20A and a volume 202B of the second storage apparatus 20B also form an HA pair 212A.

The two HA pairs 211A and 212A belong to the same HA group. An HA group is a copy group of HA pairs, and a command related to an HA pair specifies the HA group of the HA pair. All HA pairs in an HA group are operated in the same manner by a single command. This applies to copy groups of copy pairs of other types.

The third storage apparatus 20C provides a volume 201C and a volume 202C. The volume 201A and the volume 201C form an RC pair 211B, and the volume 202A and the volume 202C form an RC pair 212B. Data is duplicated in an RC pair by asynchronous remote copy. The volumes 201A and 202A are the RCPVOLs in the RC pairs 211B and 212B. The volumes 201C and 202C are the RCSVOLs in the RC pairs 211B and 212B.

The volume 201B and the volume 201C form a delta RC pair 211C, and the volume 202B and the volume 202C form a delta RC pair 212C. The volumes 201B and 202B are the delta RCPVOLs in the delta RC pairs 211C and 212C. The volumes 201C and 202C are the delta RCSVOLs in the delta RC pairs 211C and 212C.

An update of the delta RCPVOL in a delta RC pair is held in a journal volume, and reflected in the pair's delta RCSVOL by resync. Resync in a delta RC pair may be referred to as delta resync.

The first storage apparatus 20A, the second storage apparatus 20B, and the third storage apparatus 20C include JVOLs 231A, 231B, and 231C, respectively. The JVOLs 231A and 231B are journal volumes for remote copy. The JVOL 231C is a journal volume for delta remote copy.

A journal volume stores a journal. A journal is made up of write data (update data) and update information. The update information is information for managing the write data, and includes an update number, a group number, a write request reception time, a logical address, a data size, a logical address in the journal volume at which the write data is stored, and the like. The update information may hold only one of the write request reception time and the update number, instead of both.

The volumes 201A, 202A, and 231A belong to the same journal group, namely, the journal group 251A. The volumes 201C, 202C, and 231C belong to the same journal group, namely, the journal group 251C. The journal groups 251A and 251C are associated with each other in remote copy. The RC pairs 211A and 212B make up one copy group.

The update order in the journal group 251A and the update order in the journal group 251C are controlled so that the former and the latter match. In other words, the primary side and the secondary side in one remote copy group have a matching update order.

The volumes 201B, 202B, and 231B belong to the same journal group, namely, the journal group 251B. The journal groups 251B and 251C are associated with each other in delta remote copy. The delta RC pairs 211C and 212C make up one copy group.

When updating data of the volumes 201A and 202A, the first storage apparatus 20A creates journals in order to update data of the volumes 201C and 202C, and stores the journals in the JVOL 231A located within the first storage apparatus 20A.

When updating data of the volumes 201B and 202B, the second storage apparatus 20B creates journals, and stores the journals in the JVOL 231B located within the second storage apparatus 20B. The JVOL 231C of the third storage apparatus 20C is used to store journals that are transferred from the first storage apparatus 20A to the third storage apparatus 20C. The journal volumes provide the ability to choose when to transfer a journal and when to reflect a journal, and the load can therefore be balanced timewise among the storage apparatus.

An RC pair and a delta RC pair that are coordinated with each other are required to have a matching journal update number. The coordinated RC pair and delta RC pair are in the same journal group on the secondary side as described above. In FIG. 7, the JVOL 231A inside the first storage apparatus 20A and the JVOL 231B inside the second storage apparatus 20B are required to have a matching journal update number.

Update numbers are managed between the first storage apparatus 20A and the second storage apparatus 20B in a manner that allows journals stored in the JVOL 231A and journals stored in the JVOL 231B to match each other. In this embodiment, the first storage apparatus 20A, which holds the HAPVOLs 201A and 202A, determines the update number of a journal and notifies the determined update number to the second storage apparatus 20B. The second storage apparatus 20B stores in the JVOL 231B the journal including the notified update number.

For example, the first storage apparatus 20A transmits an update number to the second storage apparatus 20B along with a write request and update data received from the host computer 10. In the case of a write request received from the second storage apparatus 20B, the first storage apparatus 20A transmits an update number to the second storage apparatus 20B along with a completion report of the write request received from the second storage apparatus 20B.

Alternatively, the first storage apparatus 20A creates a journal for each write request received from the second storage apparatus 20B, and transmits the journals to the second storage apparatus 20B. The second storage apparatus 20B stores the received journals in the JVOL 231B. The second storage apparatus 20B then updates the HASVOLs 201B and 202B as indicated by the journals received from the first storage apparatus 20A.

One HA group is associated with one journal group pair in the configuration example of FIG. 7. Instead, one HA group may be associated with a plurality of journal group pairs. The update order on the primary side and the update order on the secondary side may be matched in an HA group. This applies to other types of copy groups. An HA pair may use a journal volume to transfer write data.

Figure 8A:
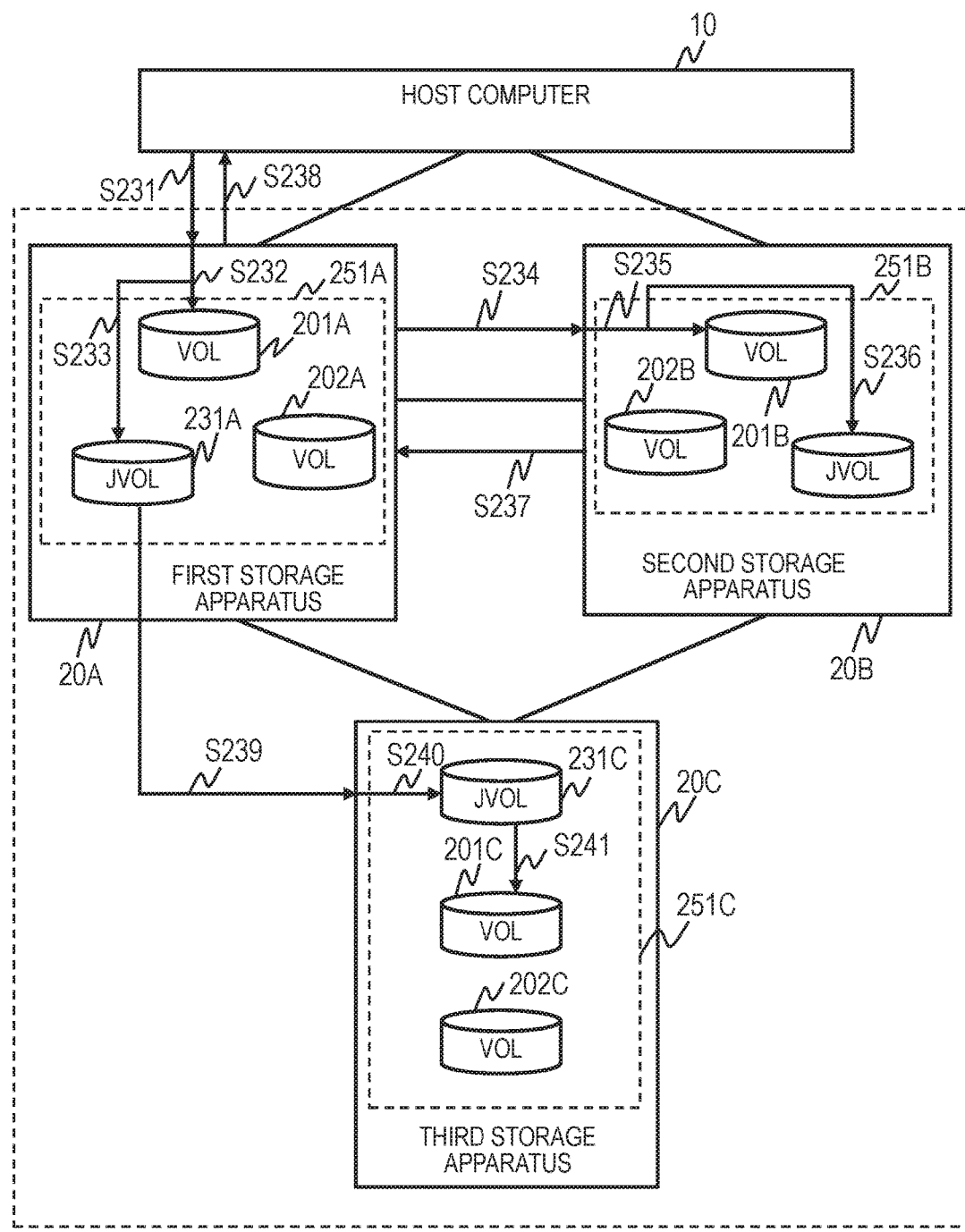
FIG. 8A depicts processing executed when the first storage apparatus receives from the host computer a request to write to the volume.

Processing executed when the first storage apparatus 20A receives from the host computer 10 a request to write to the volume 201A is illustrated in FIG. 8A. The first storage apparatus 20A receives from the host computer 10 a write request issued to the volume 201A (Step S231), stores write data in the volume 201A (Step S232), and stores a journal in the journal volume 231A (Step S233). The first storage apparatus 20A transmits the write request and the write data to the second storage apparatus 20B along with an update number (Step S234).

The second storage apparatus 20B stores the write data in the volume 201B as requested by the write request transferred from the first storage apparatus 20A (Step S235). The second storage apparatus 20B creates a journal that includes the received update number and write data, and stores the journal in the journal volume 231B (Step S236).

The first storage apparatus 20A receives a completion report from the second storage apparatus 20B (Step S237), and then transmits its own completion report to the host computer 10 (Step S238). The completion report is transmitted to the host computer 10 after the volumes 201A and 201B are updated, and the volumes 201A and 201B are synchronized with each other.

The third storage apparatus 20C reads the journal out of the journal volume 231A of the first storage apparatus 20A (Step S239), and stores the read journal in the journal volume 231C (Step S240). Specifically, the first storage apparatus 20A receives a journal read request from the third storage apparatus 20C, reads the requested journal out of the journal volume 231A, and transmits the read journal to the third storage apparatus 20C.

The third storage apparatus 20C refers to the update number to read the journal out of the journal volume 231C, and stores the write data in the volume 201C (Step S241). Data of the volume 201A in the first storage apparatus 20A and data of the volume 201C in the third storage apparatus 20C do not match at the time when the completion report is transmitted to the host computer 10, and match later. The volume 201A and the volume 201C are asynchronous with each other.

Figure 8B:
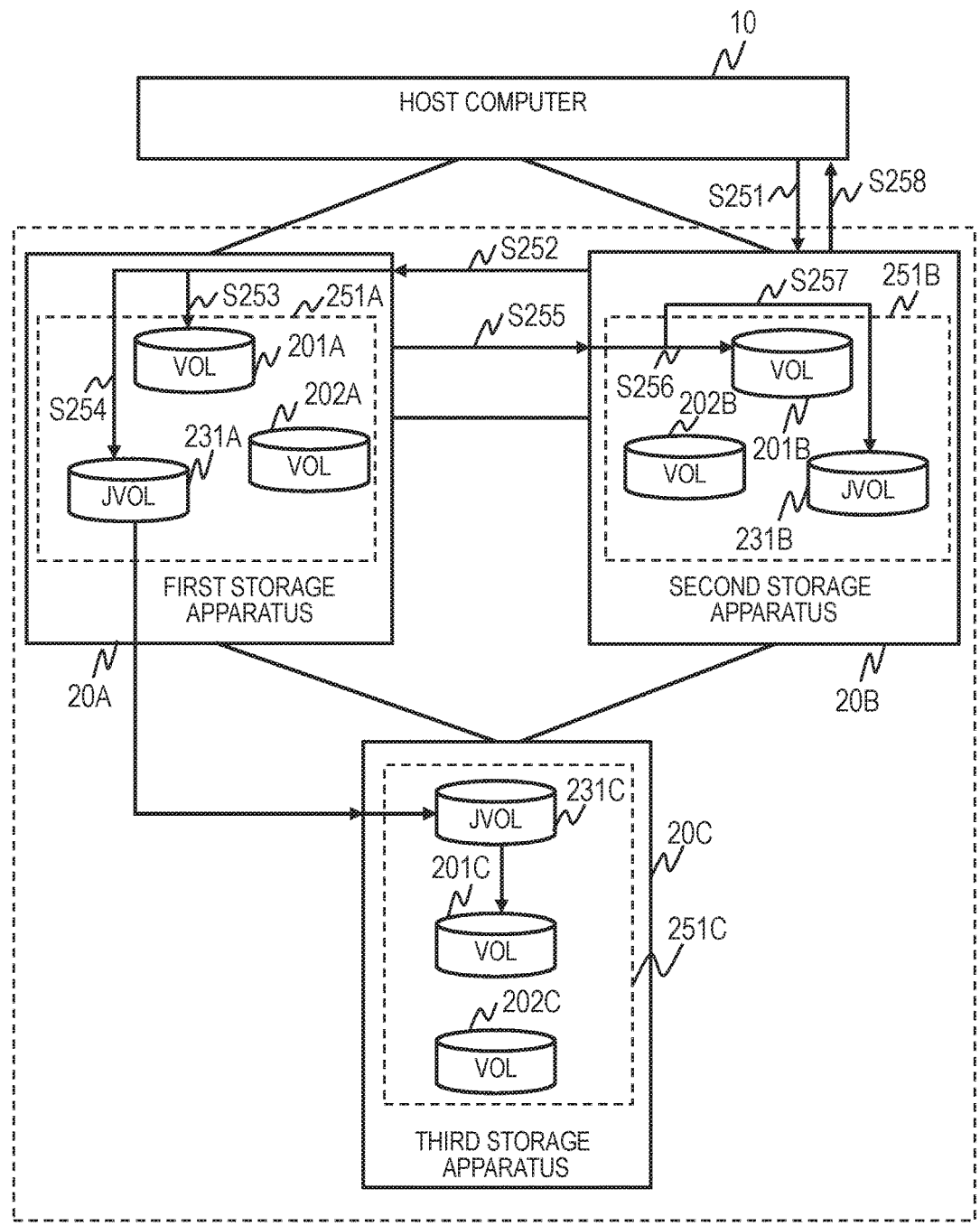

Processing executed when the second storage apparatus 20B receives from the host computer 10 a request to write to the volume 201B is illustrated in FIG. 8B. The second storage apparatus 20B receives from the host computer 10 a write request issued to the volume 201B (Step S251), and transfers the write request and write data to the first storage apparatus 20A (Step S252).

The first storage apparatus 20A stores the write data in the volume 201A (Step S253), and stores a journal in the journal volume 231A (Step S254). The first storage apparatus 20A then transmits an update number to the second storage apparatus 20B along with a completion report (Step S255).

The second storage apparatus 20B stores the write data in the volume 201B (Step S256). The second storage apparatus 20B creates a journal that includes the write data received from the host computer 10 and the update number notified by the first storage apparatus 20A, and stores the journal in the journal volume 231B (Step S257). The second storage apparatus 20B transmits its own completion report to the host computer 10 (Step S258).

Journal reading between the third storage apparatus 20C and the first storage apparatus 20A is the same as the operation executed when a write request is issued to the first storage apparatus 20A which is already described with reference to FIG. 8A. The first storage apparatus 20A may transmit to the second storage apparatus 20B a journal that is created in response to a write command received from the host computer 10 and the second storage apparatus 20B. The second storage apparatus 20B stores the received journal in the journal volume 231B.

Described next is processing that is executed when a failure occurs in the first storage apparatus 20A and delta resync is instructed. When delta resync is instructed, the delta RC pair formed by the volumes 201B and 201C and the delta RC pair formed by the volumes 202B and 202C each turn into an RC pair. The volumes 201B and 202B are RCPVOLs. The HASVOLs 201B and 202B are in an SSWS state. The SSWS state is described later.

The host computer 10 or the management apparatus 40 transmits a delta resync request to the second storage apparatus 20B. A delta resync request is a request for volume synchronization on a journal group-by-journal group basis, for example. In the configuration example of FIG. 7, the delta resync request specifies the journal group 251B (and the journal group 251C).

The second storage apparatus 20B receives the delta resync request, changes volume management information and volume pair management information, and instructs the third storage apparatus 20C to change management information. The third storage apparatus 20C changes the management information. The third storage apparatus 20C reads journals that have not been received from the first storage apparatus 20A, out of the JVOL 231B of the second storage apparatus 20B, and stores the read journals in the volumes 201C and 202C.

After the delta resync processing, the volumes 201B and 202B of the second storage apparatus 20B and the volumes 201C and 202C of the third storage apparatus 20C form RC pairs. The second storage apparatus 20B receives an I/O request from the host computer 10.

Tables held in the storage system of this embodiment are described below. The tables described below are held by each of or some of the storage apparatus 20A to 20C. The management apparatus 40 and the host computer 10 hold information equivalent to the tables held by the storage apparatus 20A to 20C. The storage system holds, in addition to the tables described below, information for managing storage apparatus and information for managing volumes.

An example of an HA pair management table 400 is shown in FIG. 9. The HA pair management table 400 is held in each of the first storage apparatus 20A and the second storage apparatus 20B, and is used to manage HA pairs set to volumes that are held in the storage apparatus 20A and 20B.

The HA pair management table 400 includes an HA pair ID field 401, an own volume ID field 402, an own volume attribute field 403, a partner volume ID field 404, a partner apparatus ID field 405, a partner volume attribute field 406, a pair state field 407, and an HA group ID field 408. The HA pair management table 400 may further include, for each HA pair, information of an RC pair and a delta RC pair that are coordinated with the HA pair.

The own volume ID field 402 and the own volume attribute field 403 indicate information about a volume of the own apparatus, namely, the storage apparatus that holds this particular HA pair management table 400. The own volume ID field 402 stores a number that is uniquely identifiable throughout the storage apparatus. The own volume attribute field 403 indicates a volume attribute such as "primary", "secondary", and "unused".

The partner volume ID field 404 and the partner apparatus ID field 405 indicate information about the pair partner volume, namely, a volume of the other storage apparatus that forms the HA pair. The partner volume ID field 404 and the partner apparatus ID field 405 indicate the volume ID of the other volume of the HA pair and the ID of the storage apparatus of the other volume, respectively. The partner volume attribute field 406 indicates a volume attribute such as "primary", "secondary", and "unused".

The pair state field 407 and the HA group ID field 408 indicate information about the HA pair. The pair state field 407 stores the state of the HA pair, for example, "pair", "copy", and "PSUS". The HA group ID field 408 indicates the ID of an HA group to which the HA pair belongs. Each storage apparatus may additionally hold the HA pair management table 400 of another storage apparatus.

An example of an RC pair management table 500 is shown in FIG. 10. The RC pair management table 500 is held in each of the first storage apparatus 20A to the third storage apparatus 20C, and is used to manage RC pairs and delta RC pairs set to volumes that are held in the storage apparatus 20A to 20C.

The RC pair management table 500 includes a pair ID field 501, an own volume ID field 502, an own volume attribute field 503, an own journal group ID field 504, a partner volume ID field 505, a partner apparatus ID field 506, a partner volume attribute field 507, a partner journal group ID field 508, a pair state field 509, a delta option field 510, and an RC group ID field 511.

The own volume ID field 502, the own volume attribute field 503, and the own journal group ID field 504 indicate information about a logical volume of the own apparatus, namely, the storage apparatus that holds this particular RC pair management table 500.

The own volume ID field 502 stores a number that is uniquely identifiable throughout the storage apparatus. The own volume attribute field 503 indicates a volume attribute such as "primary", "secondary", and "unused". The own journal group ID field 504 stores the ID of a journal group to which the volume belongs. The own journal group ID field 504 stores "null" in the case where the volume does not belong to a journal group.

The partner volume ID field 505, the partner apparatus ID field 506, the partner volume attribute field 507, and the partner journal group ID field 508 indicate information about the pair partner volume, namely, a volume of the other storage apparatus that forms the RC pair or the delta RC pair. The fields 505, 506, 507, and 508 indicate the volume ID of the other volume of the pair, the ID of the storage apparatus of the other volume, the volume attribute of the other volume, and the ID of a journal group of the other volume, respectively.

The pair state field 509, the delta option field 510, and the RC group ID field 511 indicate information about the RC pair or the delta RC pair. The pair state field 509 stores a state of the pair, for example, "copy", "pair", "PSUS", "SSWS", and "hold". The delta option field 510 indicates whether the copy pair is an RC pair or a delta RC pair. The RC group ID field 511 indicates a number that is uniquely identifiable throughout the system of a copy group to which the copy pair belongs.

An example of a journal group management table 600 is shown in FIG. 11. A journal group is an aggregation of volumes made up of at least one volume that stores data and a journal volume where journal data is stored.

The journal group management table 600 is held in each of the first storage apparatus 20A to the third storage apparatus 20C, and is used to manage journal volumes set to volumes that are held in the storage apparatus 20A to 20C.

The journal group management table 600 includes an own group ID field 601, an own group attribute field 602, an own group state field 603, a group registered volume field 604, a partner group ID field 605, a partner apparatus ID field 606, a journal creation sequential number field 607, and a purge sequential number field 608.

The own group ID field 601, the own group attribute field 602, the own group state field 603, and the group registered volume field 604 indicate information about its own journal group, namely, a journal group set to volumes of the storage apparatus that holds this particular journal group management table 600.

The own group ID field 601 stores a number by which the journal group can be identified uniquely throughout the storage apparatus. The own group attribute field 602 stores a journal attribute such as "primary", "secondary", and "unused".

The own group state field 603 stores the state of the journal group such as "started", "stopped", and "unused". The group registered volume field 604 stores information of at least one data volume and a journal volume that are registered to the journal group.

The partner group ID field 605 and the partner apparatus ID field 606 indicate information about the pair partner journal group, namely, a journal group paired with the journal group of the storage apparatus that holds this particular journal group management table 600.

The partner group ID field 605 stores a value with which the partner journal group can be identified uniquely throughout the partner apparatus. The partner apparatus ID field 606 stores the ID of the storage apparatus that holds and manages the partner journal group.

The journal creation sequential number field 607 stores the latest sequential number that is assigned to update information 620. The purge sequential number field 608 stores the sequential number of journal data that can be purged to free up a space.

Copy pair operation guard in the storage system of this embodiment is described below. The storage system of this embodiment determines whether given copy pair operation is permitted or denied based on a defined copy pair and the pair state of the copy pair. The storage system denies copy pair operation when the copy pair operation fits a given condition. Copy pair operation unsuitable for the storage system is thus prevented.

Examples of the pair state of a copy pair are described first. The pair state of a copy pair can be, for example, "pair", "SMPL (simplex)", "copy", "PSUS (suspend: running the PVOL alone)", "SSWS (swap suspend: running the SVOL alone)", "hold", or "HLDE".

When a copy pair is in the "pair" state, the copy pair is formed from a PVOL and an SVOL, and data stored in the PVOL and data stored in the SVOL match each other. The pair state "SMPL" indicates that each volume of the copy pair is a normal logical volume. When the pair state is "copy", copying for forming a copy pair is in progress, and volumes to be paired are not synchronized with each other yet. The pair state changes to "pair" once the copying for forming the copy pair is finished.

A copy pair whose pair state is "PSUS" is in a suspend state that allows only the PVOL to receive I/O from the host computer. In this state, the PVOL and the SVOL are not synchronized with each other, and an update made to the PVOL is not reflected in the SVOL. An update in the PVOL is registered in a bitmap (not shown). The bitmap indicates the site of update of the PVOL.

A copy pair whose pair state is "SSWS" is in a suspend state that allows only the SVOL to receive I/O from the host computer. In this state, the PVOL and the SVOL are not synchronized with each other, and an update made to the SVOL is not reflected in the PVOL. An update in the SVOL is registered in a bitmap. The bitmap indicates the site of update of the SVOL.

The pair state "hold" indicates standing by for delta resync, and is the normal state of a delta RC pair. When a delta RCPVOL (HASVOL) is in the pair state "hold", update data of this volume is stored in the PJVOL.

The pair state "HLDE" indicates a failure in a delta RC pair that is in the "hold" state. When a delta RCPVOL is in the "HLDE" state, update data of this volume is not stored in the PJVOL.

A specific description is given below on a method of processing a pair operation command. Only a part of the processing described below may be implemented by the storage system. The management apparatus 40 issues a pair operation command in an example described below. However, the host computer 10 or other apparatus may issue a pair operation command instead.

1. RC Pair/Delta RC Pair Forming Guard

Figure 12:
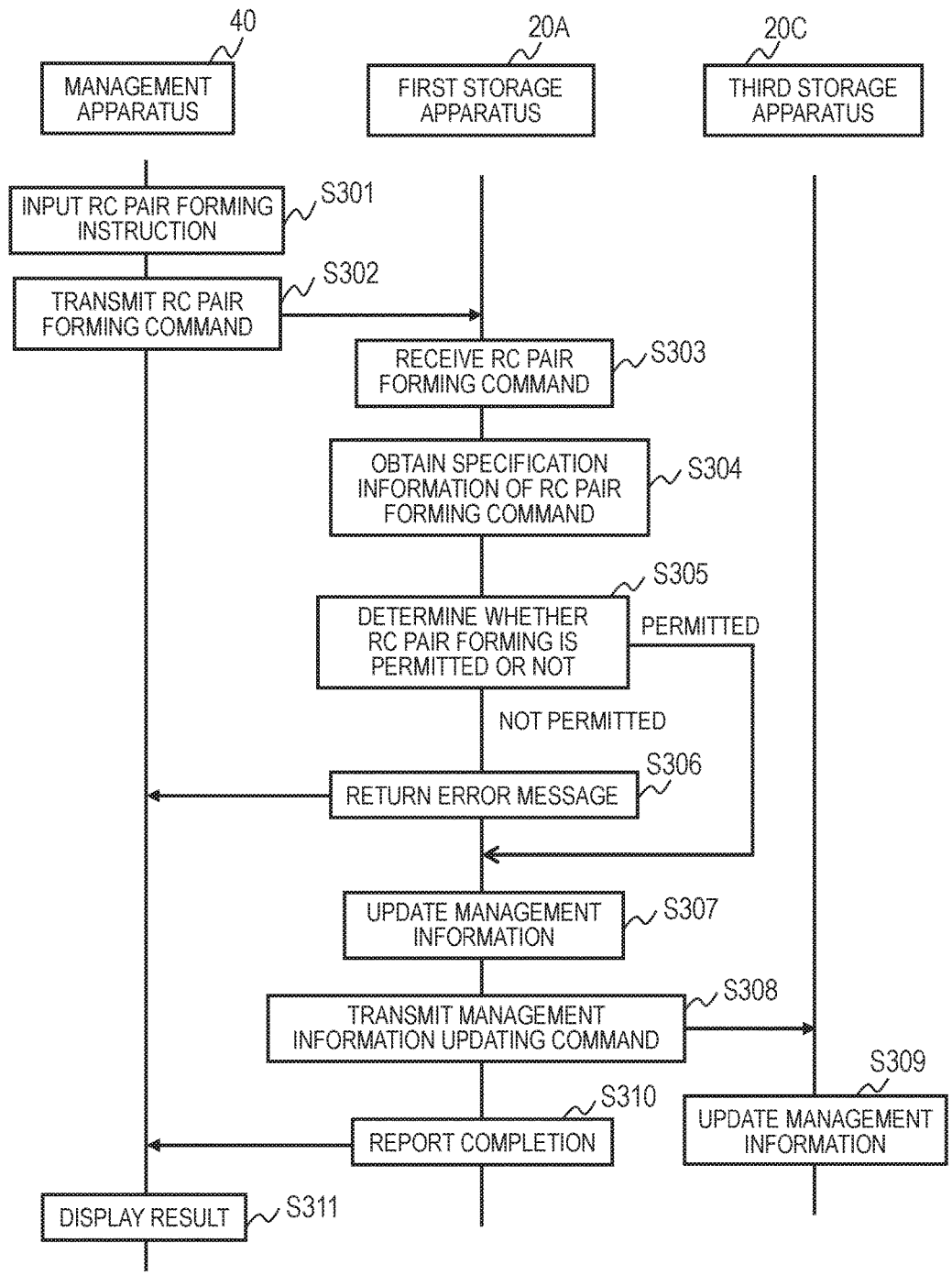
FIG. 12 depicts processing performed on an RC pair forming command.

Processing performed on an RC pair forming command is illustrated in FIG. 12. An administrator uses the input device 44 and the output device 45 of the management apparatus 40 to specify the primary side and the secondary side of an RC pair (Step S301). In this embodiment, the primary storage apparatus is the first storage apparatus 20A, and the secondary storage apparatus is the third storage apparatus 20C.

Figure 13:
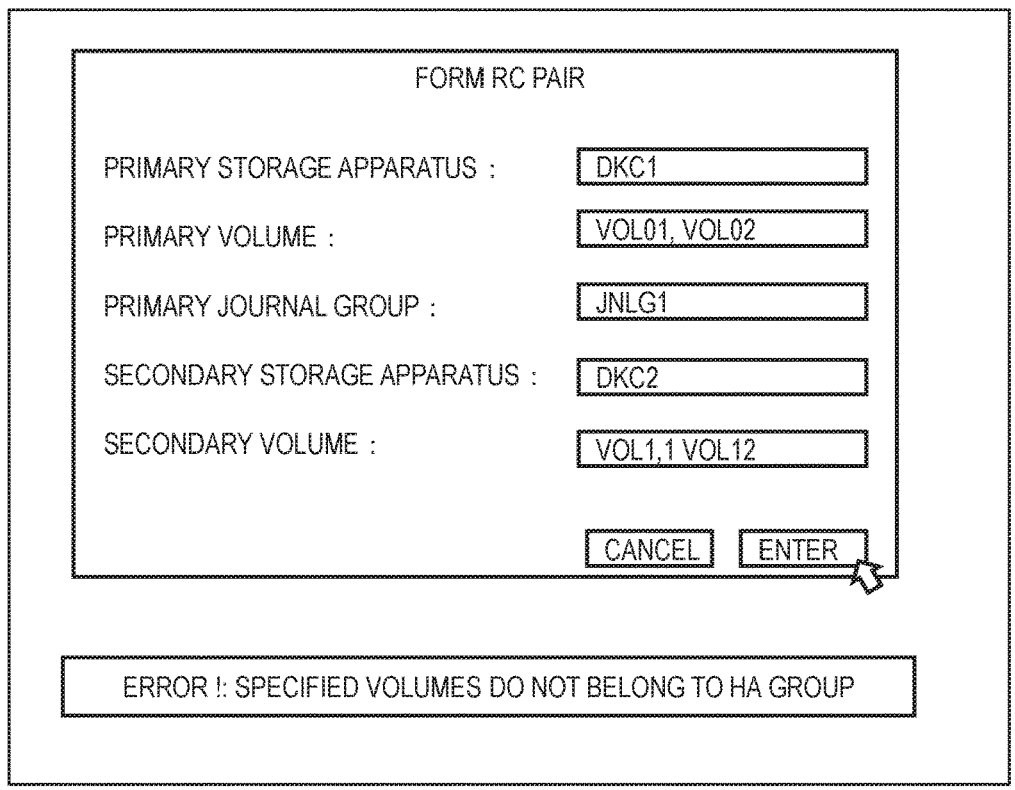
FIG. 13 depicts an example of an input and result display image.

An example of an input and result display image is illustrated in FIG. 13. The administrator specifies, as information of the primary side, the ID of the primary storage apparatus, the ID of the primary volume (RCPVOL), and the ID of the primary journal group. As information of the secondary side, the administrator specifies the ID of the secondary storage apparatus and the ID of the secondary volume (RCSVOL).

The management apparatus 40 transmits an RC pair forming command that includes the RC pair information input by the administrator to the first storage apparatus 20A (Step S302). The first storage apparatus 20A receives the RC pair forming command from the management apparatus 40 (Step S303), and obtains the specification information of the RC pair forming command (Step S304). The first storage apparatus 20A refers to the management tables 400 to 600 of copy pairs to determine whether the RC pair forming command is accepted or rejected (Step S305).

In the case of rejecting the RC pair forming command, the first storage apparatus 20A returns an error message to the management apparatus 40 (Step S306). In the case of accepting the RC pair forming command, the first storage apparatus 20A updates the management information (Step S307), and instructs the third storage apparatus 20C to update its management information (Step S308). The third storage apparatus 20C update the management information as instructed (Step S309).

The first storage apparatus 20A transmits to the management apparatus 40 a completion report that informs of the fulfillment of the RC pair forming command (Step S310). The management apparatus 40 outputs the result of processing the RC pair forming command to the output device 45 (Step S311). In FIG. 13, an example of an error result displayed on the output device 45 is illustrated. The displayed error result may include, as illustrated in FIG. 13, the cause of the error along with information about the RC pair forming command.

In the forming of a delta RC pair, the primary storage apparatus is the second storage apparatus 20B and the secondary storage apparatus is the third storage apparatus 20C. The administrator enters information similar to the one in the forming of an RC pair. The management apparatus 40 transmits a delta RC pair forming command to the second storage apparatus 20B. In the forming of a delta RC pair, the first storage apparatus 20A in the sequence of FIG. 12 is read as the second storage apparatus 20B.

A specific description is given below on several processing procedures performed on an RC pair/delta RC pair forming command.

1-1 Affiliation of the HA Pair to an HA Group

In the storage system of this embodiment, a condition for forming an RC pair/delta RC pair is that an HA pair that is coordinated with the RC pair/delta RC pair belongs to an HA group. The RC pair/delta RC pair is a copy pair for a backup of the HA pair, and is therefore formed after the HA pair is formed. In addition, an error after the forming of the coordinated copy pair is prevented by requiring the HA pair to belong to an HA group because an operation command involving an HA pair specifies an HA group.

Figure 14:
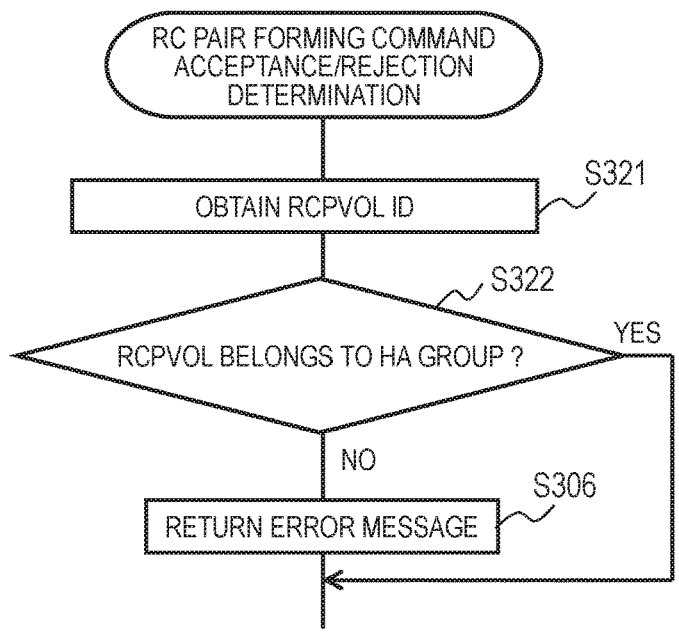
FIG. 14 depicts processing performed on an RC pair forming command.

Processing performed on an RC pair forming command is illustrated in FIG. 14. An RC pair forming command can specify a plurality of RC pairs belonging to the same RC group. The first storage apparatus 20A executes the processing of FIG. 14 for each RCPVOL specified. The first storage apparatus 20A receives an RC pair forming command from the management apparatus 40 (Step S303), and obtains the volume ID of an RCPVOL specified by the command (Step S321). The first storage apparatus 20A determines whether the specified RCPVOL belongs to a defined HA group (Step S322).

Specifically, the first storage apparatus 20A searches the HA pair management table 400 for the volume ID of the specified RCPVOL. In the case where no HA group is defined for the specified volume ID in the HA pair management table 400 (Step S322: NO), the first storage apparatus 20A refuses to form the RC pair, and returns an error report to the management apparatus 40 along with the cause of the error (Step S306).

In the case of forming a delta RC pair, the primary storage apparatus is the second storage apparatus 20B and the secondary storage apparatus is the third storage apparatus 20C. The second storage apparatus 20B receives a delta RC pair forming command from the management apparatus 40, and obtains information about a delta RCPVOL specified by the command. The second storage apparatus 20B determines whether the specified delta RCPVOL belongs to a defined HA group.

Specifically, the second storage apparatus 20B searches the HA pair management table 400 for the volume ID of the specified delta RCPVOL. In the case where no HA group is defined for the specified volume ID in the HA pair management table 400, the second storage apparatus 20B refuses to form the delta RC pair, and returns an error report to the management apparatus 40 along with the cause of the error.

1-2 Association Relation Between a Journal Group and an HA Group

In the storage system of this embodiment, only one HA group is coordinated with one journal group. One HA group may be coordinated with one or more journal groups. In this embodiment, volumes that are included in the same journal group are swapped simultaneously for efficient management of the data update order. The storage system therefore refuses to form an RC pair/delta RC pair when a journal group specified by the pair forming command is already coordinated with another HA group.

Figure 15:
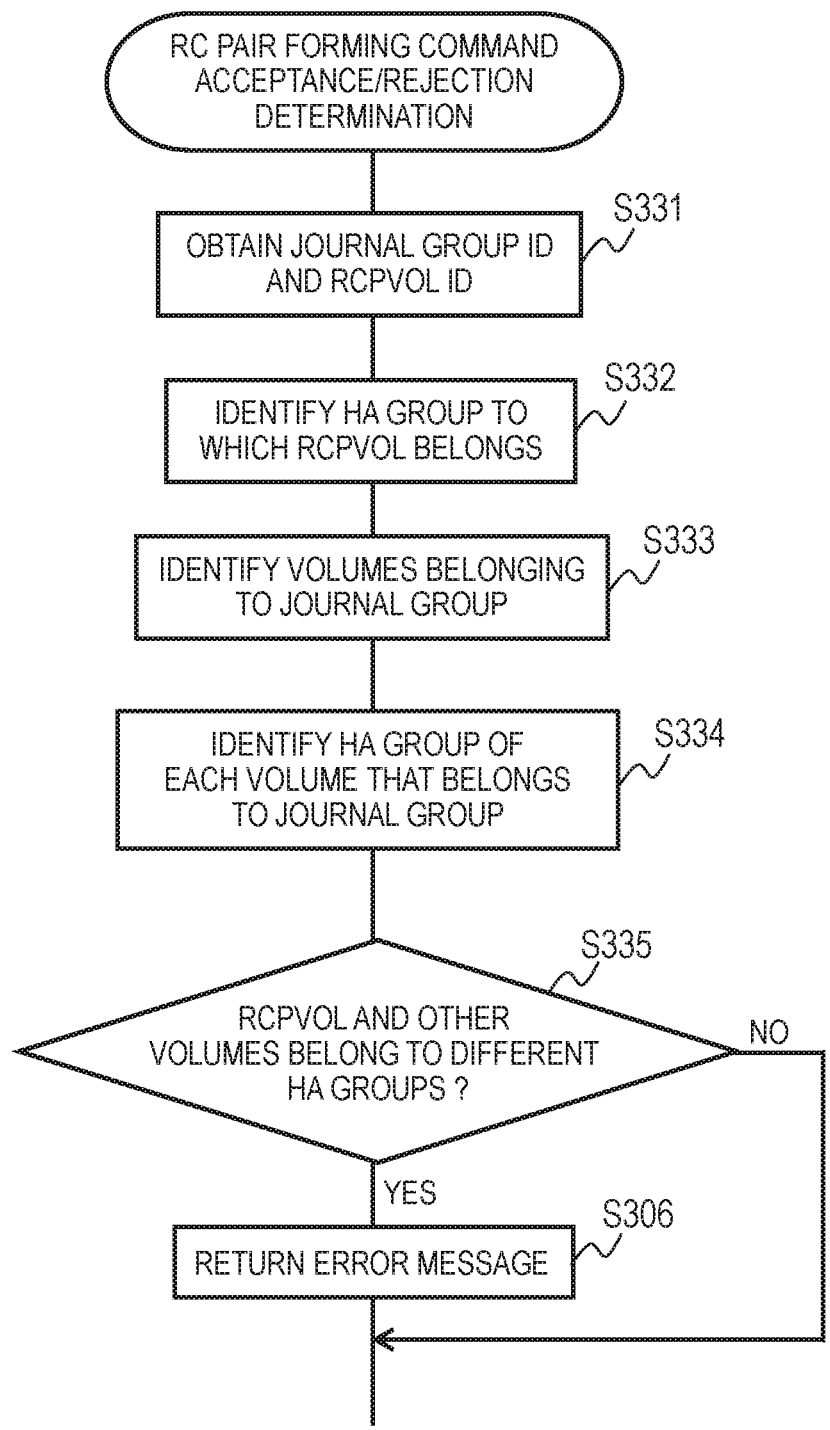
FIG. 15 depicts processing performed on an RC pair forming command.

Processing performed on an RC pair forming command is illustrated in FIG. 15. The first storage apparatus 20A executes the processing of FIG. 15 for each RCPVOL specified. Information entered by the administrator to form an RC pair is as described above. The first storage apparatus 20A receives an RC pair forming command (Step S303), and obtains a journal group ID and the volume ID of an RCPVOL from the RC pair forming command (Step S331).

The first storage apparatus 20A searches the HA pair management table 400 for the specified volume ID to identify an HA group to which the specified logical volume ID belongs (Step S332). The first storage apparatus 20A refers to the journal group management table 600 to select volumes that belong to the specified journal group (Step S333).

The first storage apparatus 20A refers to the HA pair management table 400 to identify an HA group for each volume that belongs to the journal group specified by the RC pair forming command (Step S334).

The first storage apparatus 20A determines whether any of HA groups of the volumes belonging to the specified journal group differs from the HA group of the volume specified by the RC pair forming command. In the case where at least one of the HA groups differs (Step S334: YES), the first storage apparatus 20A refuses to form the RC pair and returns an error report to the management apparatus 40 along with the cause of the error (Step S306).

In the case of forming a delta RC pair, the second storage apparatus 20B receives a delta RC pair forming command, and executes the same processing that is executed by the first storage apparatus 20A in the manner described above for a delta RCPVOL specified by the command.

1-3 Pair State of the HA Pair

In the storage system of this embodiment, that the pair state of an HA pair relevant to an RC pair/delta RC pair to be formed is "pair" is defined as a requisite condition for forming the RC pair/delta RC pair. This prevents an error in I/O operation after the forming of the coordinated copy pair. The storage system refuses to form an RC pair/delta RC pair when an HA pair of a volume specified by the forming command is in other pair states than "pair". The "pair" state of an HA pair indicates a normal synchronous copy state.

Figure 16:
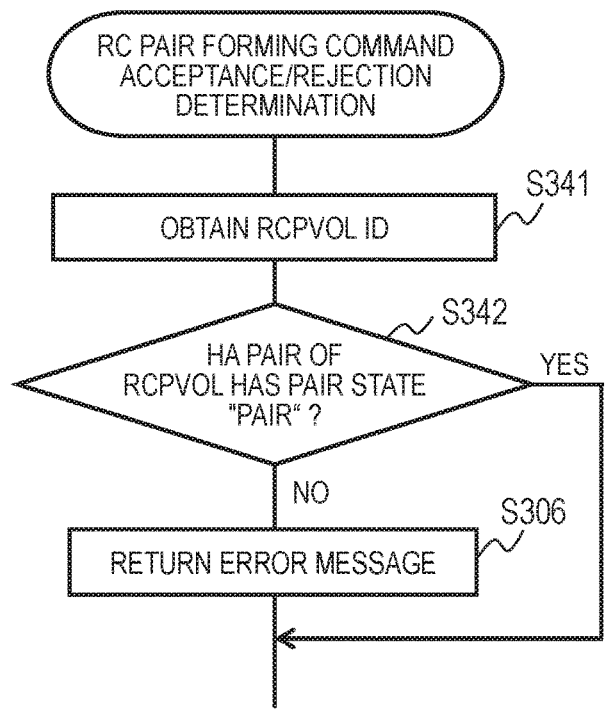
FIG. 16 depicts processing performed on an RC pair forming command.

Processing performed on an RC pair forming command is illustrated in FIG. 16. The first storage apparatus 20A executes the processing of FIG. 16 for each RCPVOL specified. Information entered by the administrator to form an RC pair is as described above. The first storage apparatus 20A receives an RC pair forming command (Step S303), and obtains the volume ID of an RCPVOL from the RC pair forming command (Step S341).

The first storage apparatus 20A searches the HA pair management table 400 for the volume ID of the specified RCPVOL, and identifies a pair state registered in the entry that holds this volume ID (Step S342). When the HA pair state of the specified RCPVOL is not the synchronous state (Step S343: NO), the first storage apparatus 20A refuses to form the RC pair, and returns an error report to the management apparatus 40 along with the cause of the error (Step S306).

In the case of forming a delta RC pair, the second storage apparatus 20B receives a delta RC pair forming command, and executes the same processing that is executed by the first storage apparatus 20A in the manner described above for a delta RCPVOL specified by the command.

1-4 Volume Relation Between Pairs

The storage system of this embodiment includes, in an RC pair, the HAPVOL of an HA pair as the RCPVOL and includes, in a delta RC pair, the HASVOL of an HA pair as the delta RCSVOL. The storage system thus manages the data update order efficiently. The storage system refuses to form an RC pair/delta RC pair when an RCPVOL specified by the pair forming command is not an HAPVOL, or when a delta RCPVOL specified by the pair forming command is not an HASVOL.

Figure 17:
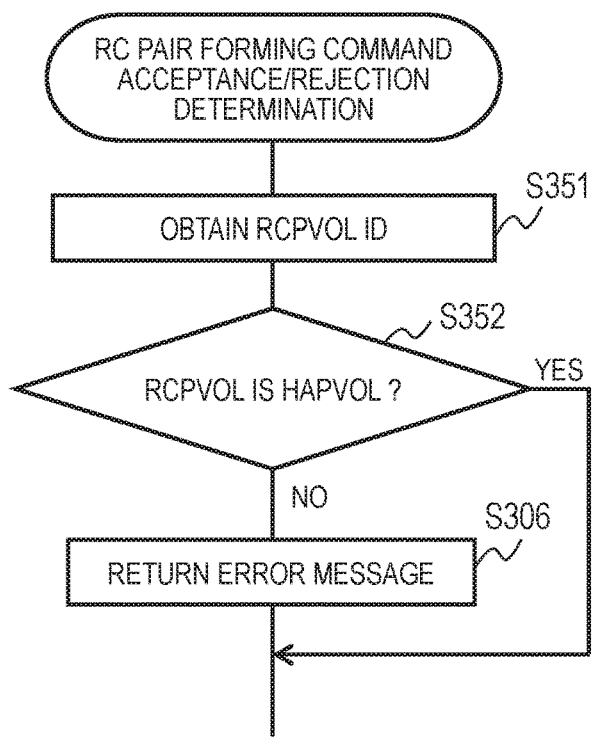
FIG. 17 depicts processing performed on an RC pair forming command.

Processing performed on an RC pair forming command is illustrated in FIG. 17. The first storage apparatus 20A executes the processing of FIG. 17 for each RCPVOL specified. Information entered by the administrator to form an RC pair is as described above. The first storage apparatus 20A receives an RC pair forming command (Step S303), and obtains the volume ID of an RCPVOL from the RC pair forming command (Step S351).

The first storage apparatus 20A refers to the HA pair management table 400 to search for the volume ID of the specified RCPVOL and identify a volume attribute that is associated with this volume ID (Step S352). When the specified RCPVOL is not the PVOL of any HA pair (Step S352: NO), the first storage apparatus 20A refuses to form the RC pair, and returns an error report to the management apparatus 40 along with the cause of the error (Step S306).

In the case of forming a delta RC pair, the second storage apparatus 20B receives a delta RC pair forming command, and obtains the volume ID of a delta RCPVOL specified by the command. The second storage apparatus 20B identifies a volume attribute that is associated with the obtained volume ID in the HA pair management table 400. In the case where the specified delta RCPVOL is not the HASVOL of any HA pair, the second storage apparatus 20B refuses to form the delta RC pair, and returns an error report to the management apparatus 40 along with the cause of the error.

1-5 The Order of Forming the RC Pair and the Delta RC Pair

Figure 18:
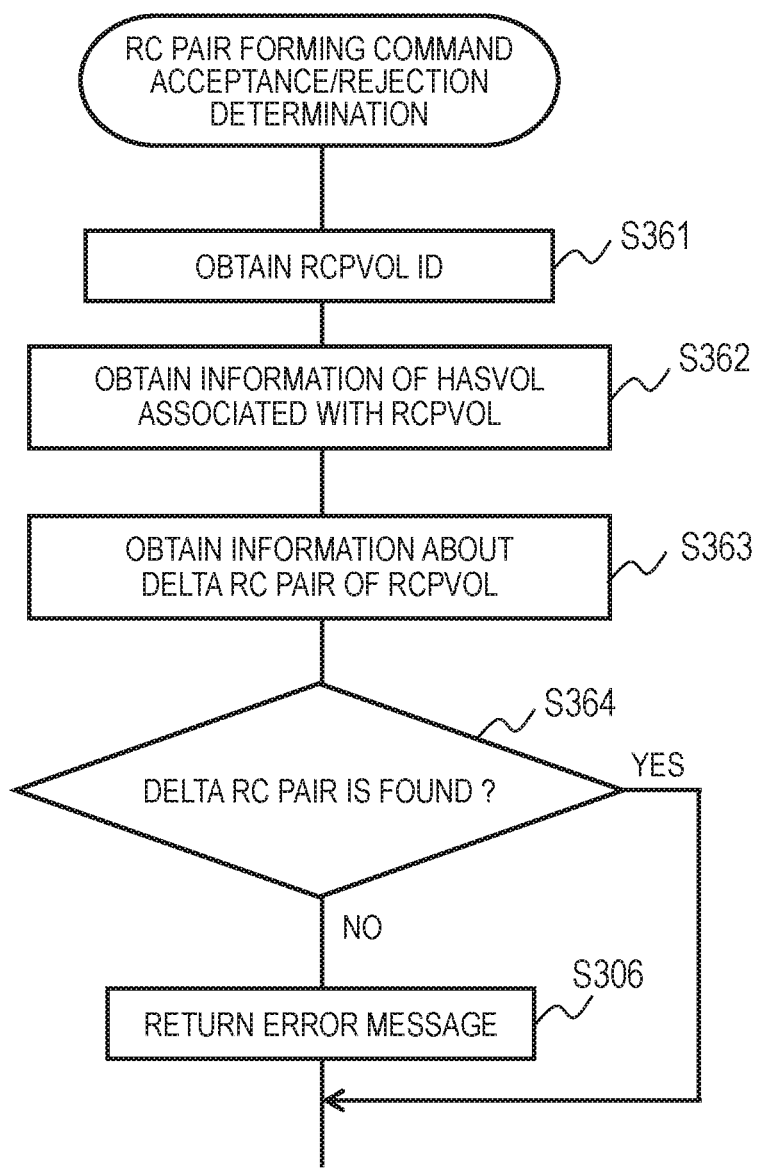
FIG. 18 depicts processing performed on an RC pair forming command.

The storage system of this embodiment forms an RC pair after the relevant delta RC pair is formed. This ensures data consistency between volumes through delta resync. Processing performed on an RC pair forming command is illustrated in FIG. 18. The first storage apparatus 20A executes the processing of FIG. 18 for each RCPVOL specified by the command. Information that the administrator enters to form an RC pair is as described above.

The first storage apparatus 20A receives an RC pair forming command (Step S303), and obtains the volume ID of an RCPVOL from the RC pair forming command (Step S361). The first storage apparatus 20A searches the HA pair management table 400 for the volume ID of the specified RCPVOL to obtain information about the HASVOL of an HA pair that includes the volume having this volume ID (Step S362). The first storage apparatus 20A obtains from the second storage apparatus 20B information about a delta RC pair of the specified RCPVOL (Step S363).

Specifically, the first storage apparatus 20A makes an inquiry to the second storage apparatus 20B about the presence of the delta RC pair by specifying the obtained volume ID of the HASVOL. The second storage apparatus 20B searches the RC pair management table 500 for the received volume ID of the HASVOL. The second storage apparatus 20B sends a response that indicates the result of the search to the first storage apparatus 20A. The first storage apparatus 20A may obtain the management information of the second storage apparatus 20B in advance.

In the case where the result of the search conducted by the second storage apparatus 20B indicates that no delta RC pair is coordinated with the HA pair of the RCPVOL specified by the RC pair forming command (Step S364: NO), the first storage apparatus 20A refuses to form the RC pair, and returns an error report to the management apparatus 40 along with the cause of the error (Step S306).

2. RC Pair/Delta RC Pair Operation after Pair Forming 2-1 Swap Suspend/Swap Resync of the RC Pair In the storage system of this embodiment, that the pair state of the HAPVOL of an HA pair coordinated with an RC pair is "PSUS" is defined as a requisite condition for executing a swap suspend command/swap resync command for the RC pair.

A swap suspend command issued to an RC pair instructs a change of the pair state of the RC pair to "SSWS". A swap resync command issued to an RC pair instructs the RC pair in the "SSWS" state to change the pair state to "pair" by switching the RCPVOL to the RCPVOL and switching the RCPVOL to the RCPVOL. After the command is executed, the volume that has been the RCPVOL before the execution of the command receives I/O requests from the host computer 10. The management information is also updated in the two storage apparatus of the RC pair.

For example, a case where the RC pair 211B receives a swap suspend command/swap resync command in the configuration of FIG. 7 is discussed. After the command is executed, the volume 201C of the third storage apparatus 20C receives I/O requests. If the HASVOL 201B in the coordinated HA pair 211A receives an I/O request, the requested update cannot be reflected in the volume 201C, resulting in data inconsistency between the volume 201B and the volume 201C. This embodiment prevents this data inconsistency.

Figure 19:
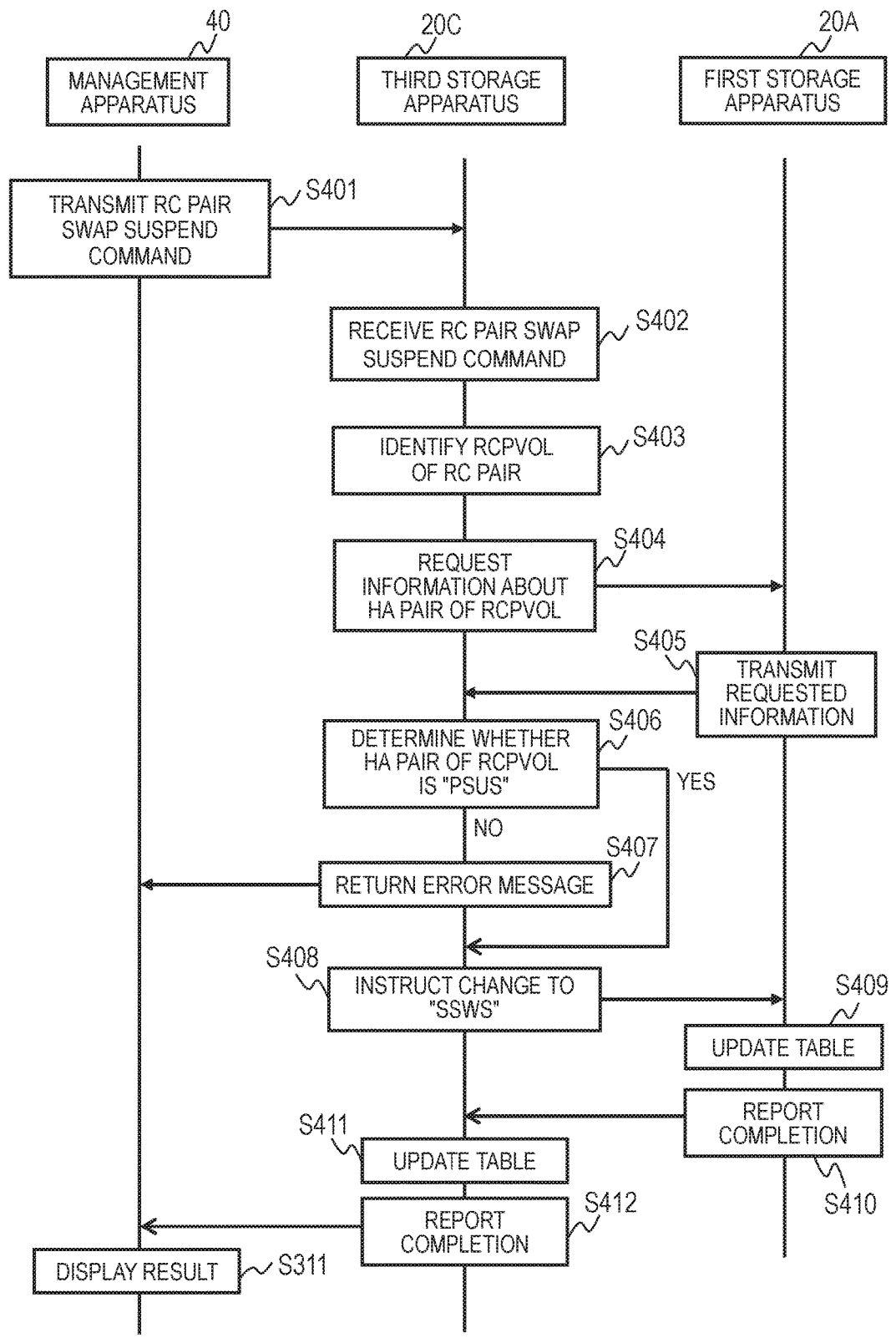
FIG. 19 depicts processing that is performed on a swap suspend command issued to an RC pair.

Processing that is performed on a swap suspend command issued to an RC pair is illustrated in FIG. 19. The swap suspend command specifies an RC pair group. The storage system executes processing described below for each RC pair included in the RC pair group.

The management apparatus 40 transmits a swap suspend command issued to an RC pair (Step S401). The third storage apparatus 20C receives the swap suspend command (Step S402). The third storage apparatus 20C refers to the RC pair management table 500 to identify the RCPVOL of this RC pair (Step S403).

The third storage apparatus 20C uses information of the HA pair management table 400 to determine whether the pair state of an HA pair that is coordinated with the identified RCPVOL is "PSUS". Specifically, the third storage apparatus 20C requests information about the HA pair of the identified RCPVOL from the first storage apparatus 20A, by specifying a volume ID (Step S404).

The first storage apparatus 20A obtains from the HA pair management table 400 information of the HA pair that is associated with the specified volume ID, and transmits the information to the third storage apparatus 20C (Step S405). The third storage apparatus 20C may obtain the HA pair management table 400 of the first storage apparatus 20A in advance.

The third storage apparatus 20C determines whether the obtained pair state of the HA pair is "PSUS" (Step S406). In the case where the pair state is not "PSUS" in the HA pair of the specified RCPVOL (Step S406: NO), the third storage apparatus 20C returns an error message that indicates the cause of the error (Step S407).

In the case where the pair state of the HA pair and other conditions are fulfilled, the third storage apparatus 20C executes the swap suspend command. The third storage apparatus 20C instructs the first storage apparatus 20A to shift to swap suspend (Step S408). The first storage apparatus 20A changes the value of the relevant cell in the pair state field 509 of the RC pair management table 500 to "SSWS" (Step S409), and transmits a completion report to the third storage apparatus 20C (Step S410). The pair state of the RCPVOL in the first storage apparatus 20A may be "PSUS" instead.

The third storage apparatus 20C changes the value of the relevant cell in the pair state field 509 of the RC pair management table 500 to "SSWS" (Step S411), and transmits a completion report to the management apparatus 40 (Step S412).

Determining whether a swap resync command issued to an RC pair is accepted or rejected and sending an error message in response to the command are executed by the same processing that is described above with regards to swap suspend.

2-2 Breaking Up the Delta RC Pair

The storage system of this embodiment breaks up an RC pair coordinated with a delta RC pair at the same time as the delta RC pair in the case where the coordinated RC pair is present when a command to break up the delta RC pair is received. The order of creating coordinated pairs and the order of breaking up the coordinated pairs are thus matched with each other. Through the breaking up of the delta RC pair, information of a pair that is coordinated with an HA pair is prevented from leaving in the HA pair, which has started to run alone.

Figure 20:
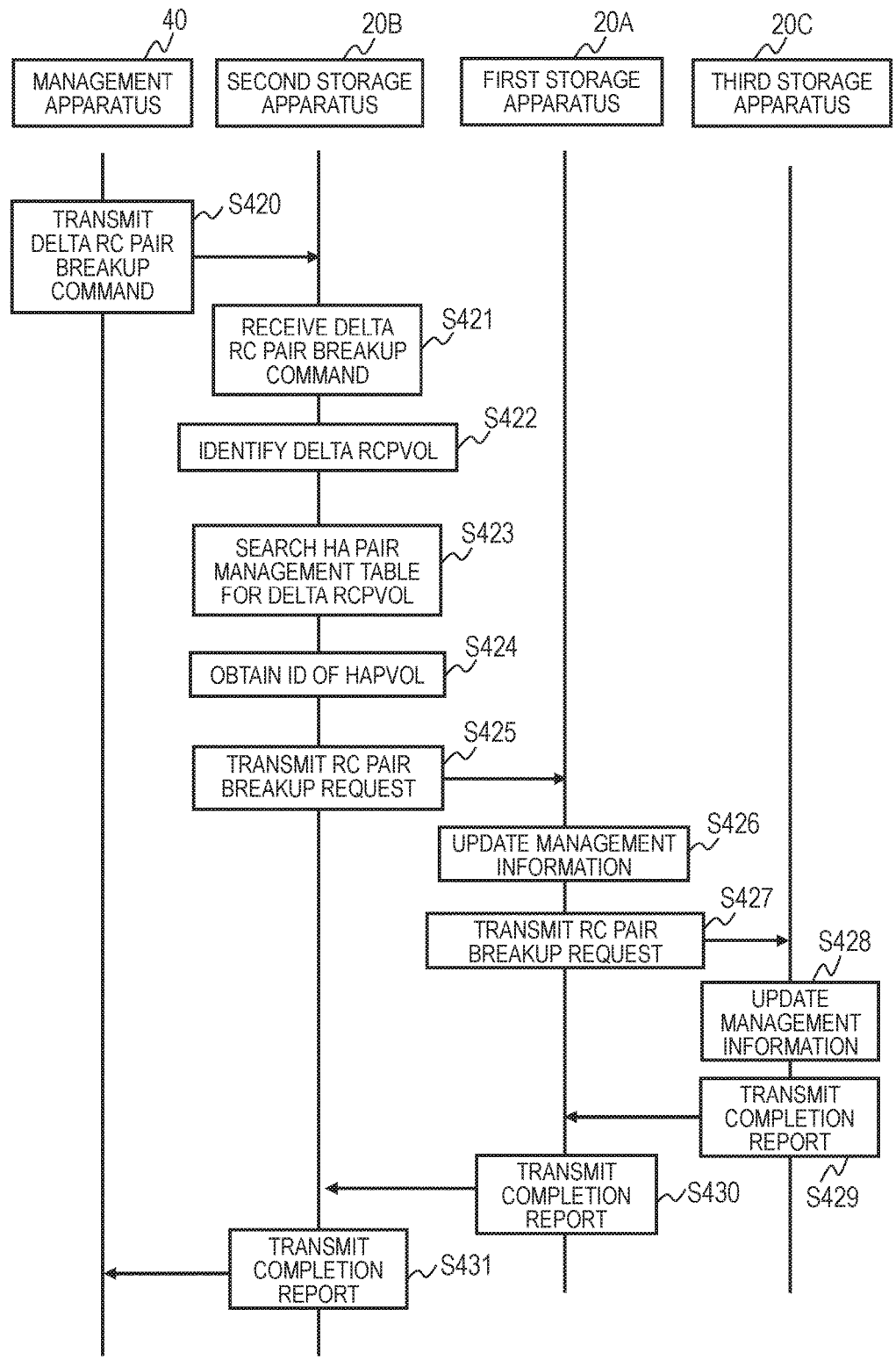
FIG. 20 depicts processing performed on a delta RC pair breakup command.

Processing performed on a delta RC pair breakup command is illustrated in FIG. 20. A delta RC pair breakup command is issued by the management apparatus 40. The host computer 10 may issue a delta RC pair breakup command instead. The administrator uses the input device 44 and the output device 45 of the management apparatus 40 to specify a copy group of the delta RC pair. Specifying a copy group of delta RC is equivalent to specifying each delta RC pair. The second storage apparatus 20B executes the processing of FIG. 20 for each delta RC pair specified.

The management apparatus 40 transmits a delta RC pair breakup command that includes a delta RC pair group specified by the user (Step S420). The second storage apparatus 20B receives the delta RC pair breakup command (Step S421). When receiving the delta RC pair breakup command, the second storage apparatus 20B refers to the RC pair management table 500 to identify the delta RCPVOL of the specified delta RC pair (Step S422).

The second storage apparatus 20B searches the HA pair management table 400 for the volume ID of the identified delta RCPVOL (Step S423). The second storage apparatus 20B obtains from the HA pair management table 400 the volume ID of the HAPVOL that forms an HA pair with the identified delta RCPVOL (Step S424). This HAPVOL is a volume of the first storage apparatus 20A.

The second storage apparatus 20B transmits to the first storage apparatus 20A an RC pair breakup request that specifies the volume ID of the identified HAPVOL (Step S425). The first storage apparatus 20A obtains the volume ID of the HAPVOL from the received RC pair breakup request. The first storage apparatus 20A updates information of an RC pair that includes a volume having the specified volume ID in the RC pair management table 500 (Step S426). The pair status of the RC pair after broken up is changed to "SMPL".

The first storage apparatus 20A further transmits an RC pair breakup request that specifies the pair ID of the broken up RC pair to the third storage apparatus 20C (Step S427). The third storage apparatus 20C updates information of the specified RC pair in the RC pair management table 500 (Step S428), and transmits a completion report to the first storage apparatus 20A (Step S429).

After finishing updating the RC pair management table 500 and after receiving the completion report from the third storage apparatus 20C, the first storage apparatus 20A transmits a completion report to the second storage apparatus 20B (Step S431). The second storage apparatus 20B updates information of the specified delta RC pair in the RC pair management table 500 (Step S432). The pair state of the delta RC pair after broken up is changed to "SMPL".

After breaking up the specified delta RC pair and its coordinated RC pair is finished, the second storage apparatus 20B transmits a completion report that informs of the completion of breaking up the specified delta RC pair and its coordinated RC pair to the management apparatus 40 (Step S433).

The second storage apparatus 20B may transmit the RC pair breakup request to the third storage apparatus 20C. The second storage apparatus 20B transmits, for example, an RC pair breakup request that includes the volume ID of the SVOL of the specified delta RC pair. In the case where there is an RC pair coordinated with the delta RC pair, the second storage apparatus 20B may send a breakup refusal message in response to the delta RC pair breakup request.

2-3 Recovery of the Delta RC Pair

In the storage system of this embodiment, that the pair state of an RC pair coordinated with a delta RC pair that is in an error state ("HLDE") is "PSUS" is defined as a condition for executing a command to recover the delta RC pair. The storage system receives a command to recover a delta RC pair and checks the pair state of an RC pair coordinated with the delta RC pair. The storage system rejects the delta RC pair recovery command when the pair state of the coordinated RC pair is not "PSUS".

The pair state of the delta RC pair changes from "hold" to "HLDE" when a journal volume for the delta RC pair is blocked or full. No journal is generated and stored for the delta RCPVOL while the delta RC pair is in the "HLDE" state. The delta RC pair recovery command is executed by deleting journals of the delta RC pair.

By defining the pair state of the coordinated RC pair being "PSUS" as a requisite condition for executing a delta RC pair recovery command, inconsistency between journals of the RC pair and the delta RC pair is avoided at the time when the command is executed. The pair state of the coordinated RC pair is changed to "pair" after the delta RC pair is recovered in keeping with the order of forming the copy pairs.

Processing that is performed on a delta RC pair recovery command issued by the management apparatus 40 is described below. When noticing a delta RC pair that is in the "HLDE" state, the administrator removes the failure and then inputs a recovery command with the use of the input device 44 of the management apparatus 40. The recovery command specifies a journal group ID, a partner storage apparatus ID, and a partner journal group ID.

Figure 21:
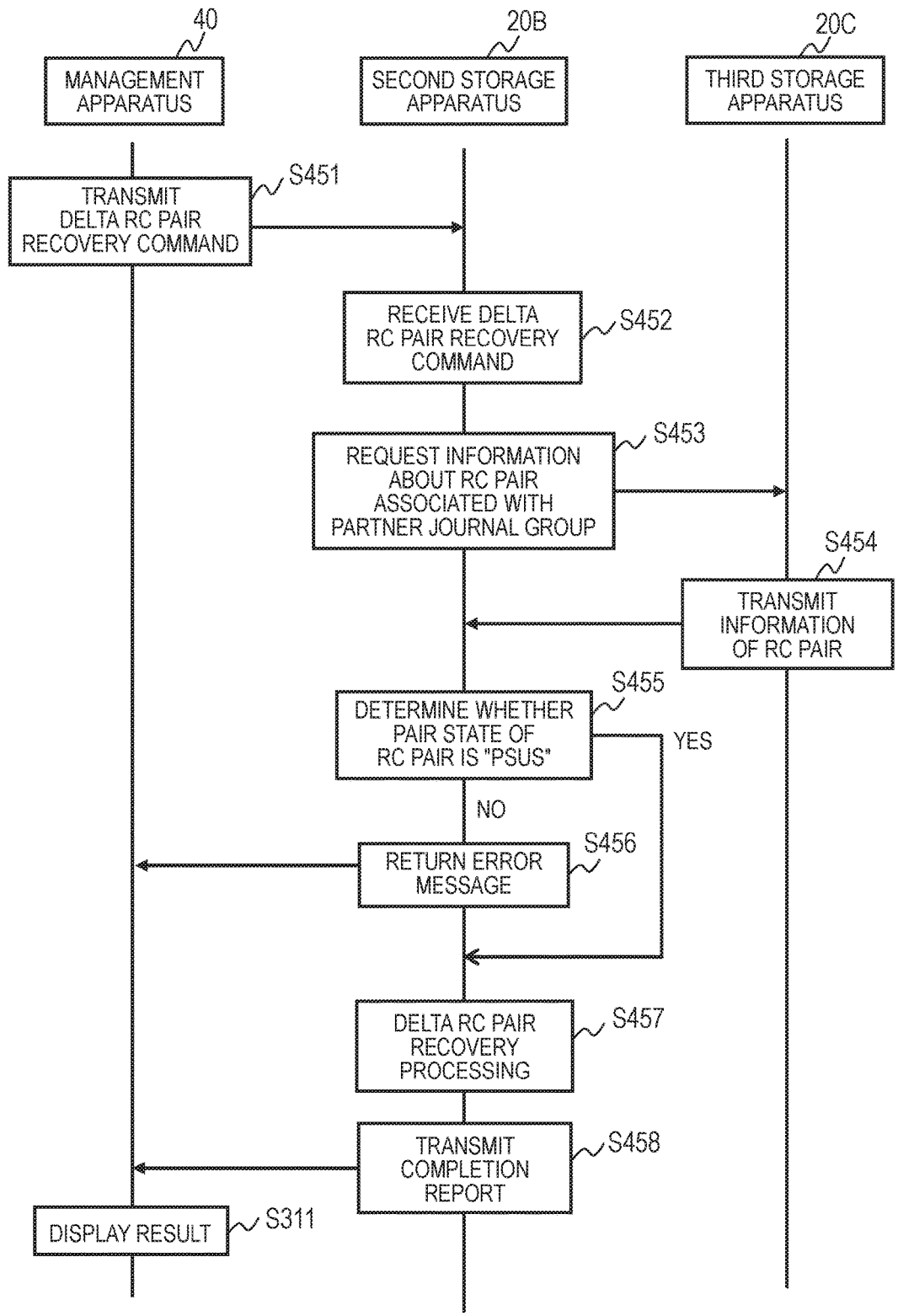
FIG. 21 depicts processing performed on the delta RC pair recovery command.

Processing performed on the delta RC pair recovery command is illustrated in FIG. 21. The management apparatus 40 transmits to the second storage apparatus 20B the delta RC pair recovery command including the specified journal group ID, partner storage apparatus ID, and partner journal group ID (Step S451).

The second storage apparatus 20B obtains the partner journal group ID from the delta RC pair recovery command (Step S452). The second storage apparatus 20B requests information about an RC pair that is associated with the obtained partner journal group ID from the third storage apparatus 20C (Step S453).

The third storage apparatus 20C searches the RC pair management table 500 for the specified journal group ID to identify the pair state of an RC pair that is associated with the specified journal group ID. The third storage apparatus 20C returns a report that indicates the identified RC pair state to the second storage apparatus 20B (Step S454). The second storage apparatus 20B may obtain the management information of the third storage apparatus 20C in advance.

In the case where the RC pair state transmitted from the third storage apparatus 20C is not "PSUS" (Step S455: NO), the second storage apparatus 20B rejects the delta RC pair recovery command, and returns an error report to the management apparatus 40 along with the cause of the error (Step S456).

In delta RC pair recovery processing (Step S457), the second storage apparatus 20B executes processing of checking whether the delta RC pair can be recovered to a normal delta RC pair, generates and stores journals, and updates the pair state of the delta RC pair to "hold". The second storage apparatus 20B transmits a completion report to the management apparatus 40 after the delta RC pair recovery processing.

3. Pair Operation of the HA Pair 3-1 Forming an HA Pair

The storage system of this embodiment forms an HA pair and then forms a delta RC pair and an RC pair that are coordinated with the HA pair. The storage system therefore rejects a command to form an HA pair in the case where a delta RC pair and an RC pair that are coordinated with the HA pair are already formed.

Processing that is performed on an HA pair forming command issued by the management apparatus 40 is described. The administrator uses the input device 44 and the output device 45 of the management apparatus 40 to specify the primary side and the secondary side of an HA pair.

The administrator specifies, as information of the primary side, the ID of the primary storage apparatus and the ID of the primary volume (HAPVOL). As information of the secondary side, the administrator specifies the ID of the secondary storage apparatus and the ID of the secondary volume (HASVOL). In the case of an HA pair forming command that specifies a plurality of HA pairs included in the same HA group, processing described below is executed for each HA pair included.

Figure 22:
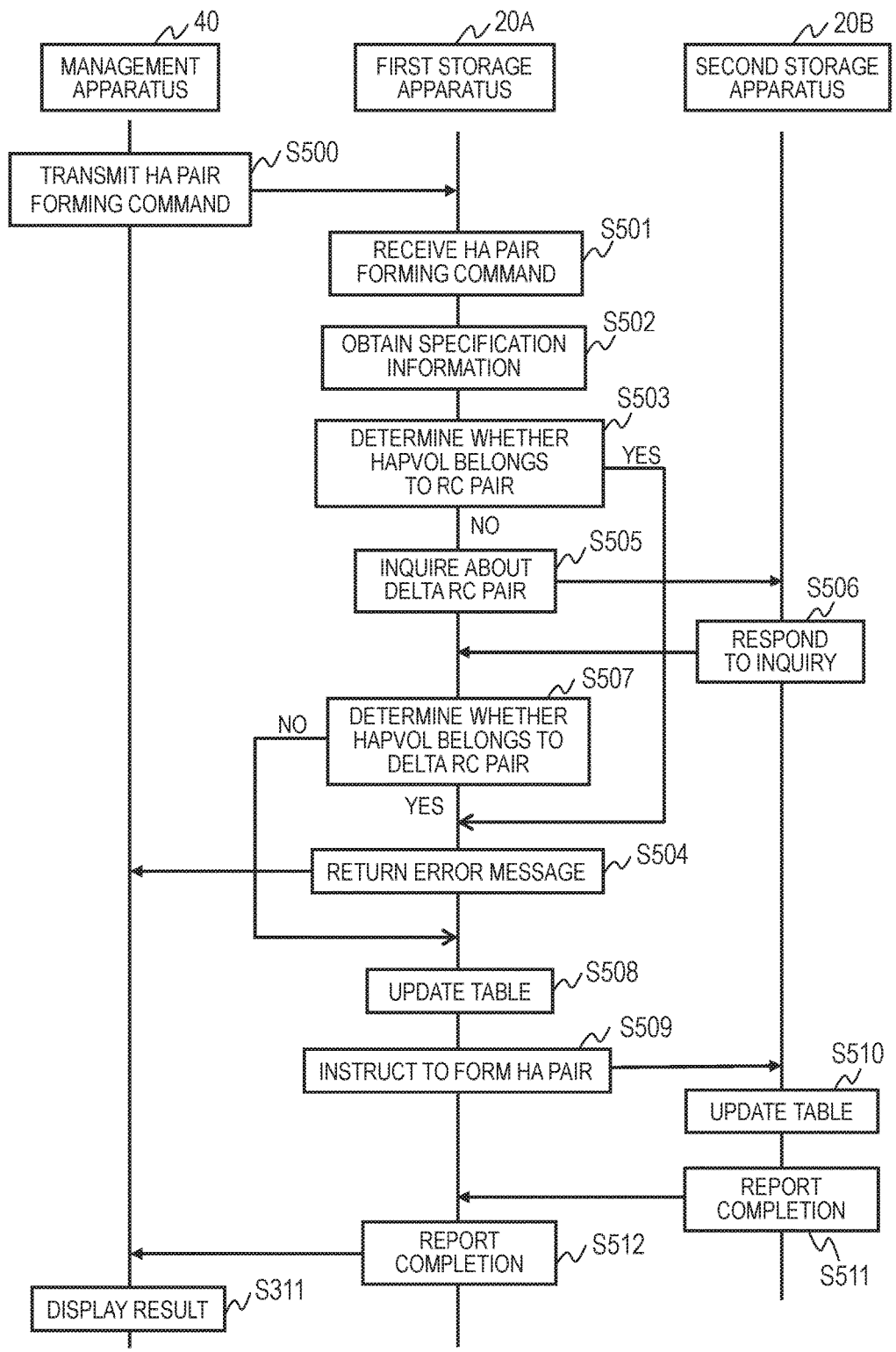
FIG. 22 depicts processing performed on the HA pair forming command.

Processing performed on the HA pair forming command is illustrated in FIG. 22. The management apparatus 40 transmits the HA pair forming command that includes the HA pair information input by the administrator to the first storage apparatus 20A (Step S500). The first storage apparatus 20A receives the HA pair forming command from the management apparatus 40 (Step S501), and obtains the specification information of the command (Step S502). The first storage apparatus 20A determines whether the specified HAPVOL belongs to a defined RC pair (Step S503). Specifically, the first storage apparatus 20A searches the RC pair management table 500 for the specified volume ID of the HAPVOL.

When there is an RC pair defined for the specified volume ID in the RC pair management table 500 (Step S503: YES), the first storage apparatus 20A refuses to form the HA pair, and returns an error report to the management apparatus 40 along with the cause of the error (Step S504). The management apparatus 40 displays the error result on the output device 45.

When there is no coordinated RC pair, the first storage apparatus 20A determines whether the specified HASVOL belongs to a coordinated delta RC pair. Specifically, the first storage apparatus 20A makes an inquiry to the second storage apparatus 20B about the presence of the delta RC pair by specifying a volume ID (Step S505).

The second storage apparatus 20B searches the RC pair management table 500 for a delta RC pair that includes a volume having the specified volume ID, and returns the result of the search to the first storage apparatus 20A (Step S506). The first storage apparatus 20A may obtain the management information of the second storage apparatus 20B in advance. The inquiry is unnecessary in that case.

When it is determined from the search result received from the second storage apparatus 20B that the HASVOL belongs to the delta RC pair (Step S507: YES), the first storage apparatus 20A refuses to form the HA pair and returns an error report to the management apparatus 40 along with the cause of the error (Step S504). The management apparatus 40 displays the error result on the output device 45.

In the case where the condition described above and other conditions for forming the specified HA pair are fulfilled, the first storage apparatus 20A updates the HA pair management table 400 (Step S508), and instructs the second storage apparatus 20B to create the HA pair by specifying volumes (Step S509). The second storage apparatus 20B updates the HA pair management table 400 (Step S510), and transmits a completion report to the first storage apparatus 20A (Step S511). The first storage apparatus 20A transmits a completion report to the management apparatus 40 (Step S512).

3-2 HA Resync

In the storage system of this embodiment, that the HAPVOL of an HA pair is the RCPVOL of an RC pair coordinated with the HA pair, or that the HAPVOL is in the "SSWS" state, is defined as a requisite condition for executing an HA resync command. The storage system rejects the HA resync command when this condition is not fulfilled. The HAPVOL can thus receive I/O requests from the host computer 10 after the HA resync.

Figure 23:
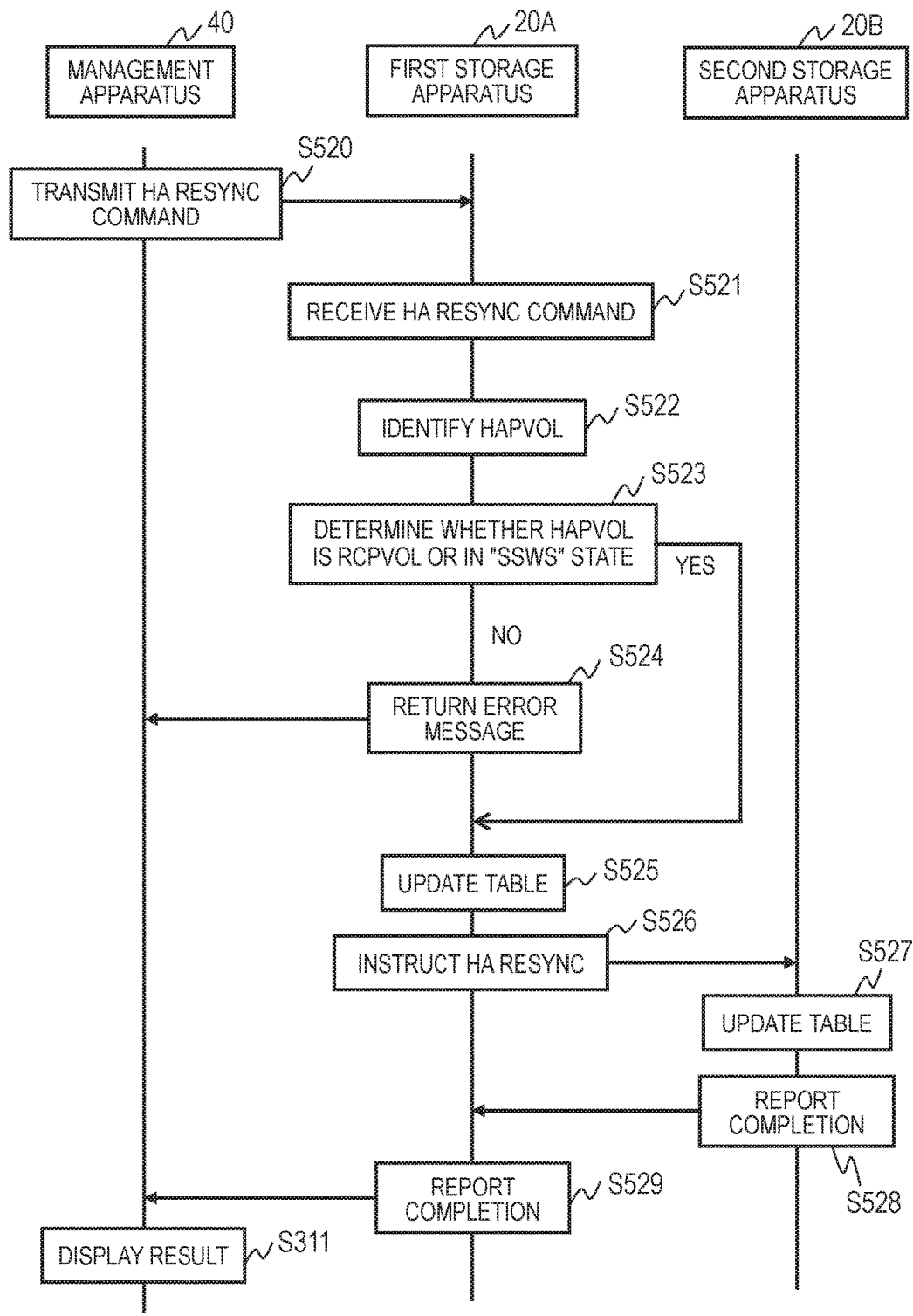
FIG. 23 depicts Processing of an HA resync command.

An HA resync command instructs a change of an HA pair from the "PSUS" state to the "pair" state. Processing of an HA resync command is illustrated in FIG. 23. The administrator uses the input device 44 and the output device 45 of the management apparatus 40 to specify an HA group ID.

The management apparatus 40 transmits to the first storage apparatus 20A an HA resync command that includes the specified HA group ID (Step S520). The first storage apparatus 20A receives the HA resync command (Step S521), and refers to the HA pair management table 400 to identify the HAPVOL for each HA pair in the HA group (Step S522).

The first storage apparatus 20A refers to the RC pair management table 500 to determine, for each HAPVOL, whether the HAPVOL is the RCPVOL or in the "SSWS" state (Step S523). In the case where any of the HAPVOLs is a volume that is not the RCPVOL and is in a state that is not the "SSWS" state, the first storage apparatus 20A returns an error message to the management apparatus 40 (Step S524).

In the case where the condition described above and other conditions for resynchronizing the specified HA pair are fulfilled, the first storage apparatus 20A changes the value of the relevant cell in the pair state field 407 of the HA pair management table 400 to "pair" (Step S525), and instructs the second storage apparatus 20B to resynchronize the pair by specifying the HA group (Step S526).

The second storage apparatus 20B changes the value of the relevant cell in the pair state field 407 of the HA pair management table 400 to "pair" (Step S527), and transmits a completion report to the first storage apparatus 20A (Step S528). The first storage apparatus 20A transmits a completion report to the management apparatus 40 (Step S529).

3-3 Breaking Up the HA Pair

The storage system of this embodiment breaks up coordinated copy pairs in an order reverse to the forming order of the coordinated copy pairs. For example, the storage system breaks up the HA pair after the RC pair and the delta RC pair are broken up. Therefore, when a command is received to break up an HA pair that has an RC pair or delta RC pair coordinated with the HA pair, the storage system notifies the administrator that the RC pair is to be broken up first.

Processing that is executed on an HA pair breakup command issued by the management apparatus 40 is described. The administrator uses the input device 44 and the output device 45 of the management apparatus 40 to specify the ID of an HA group.

Figure 24:
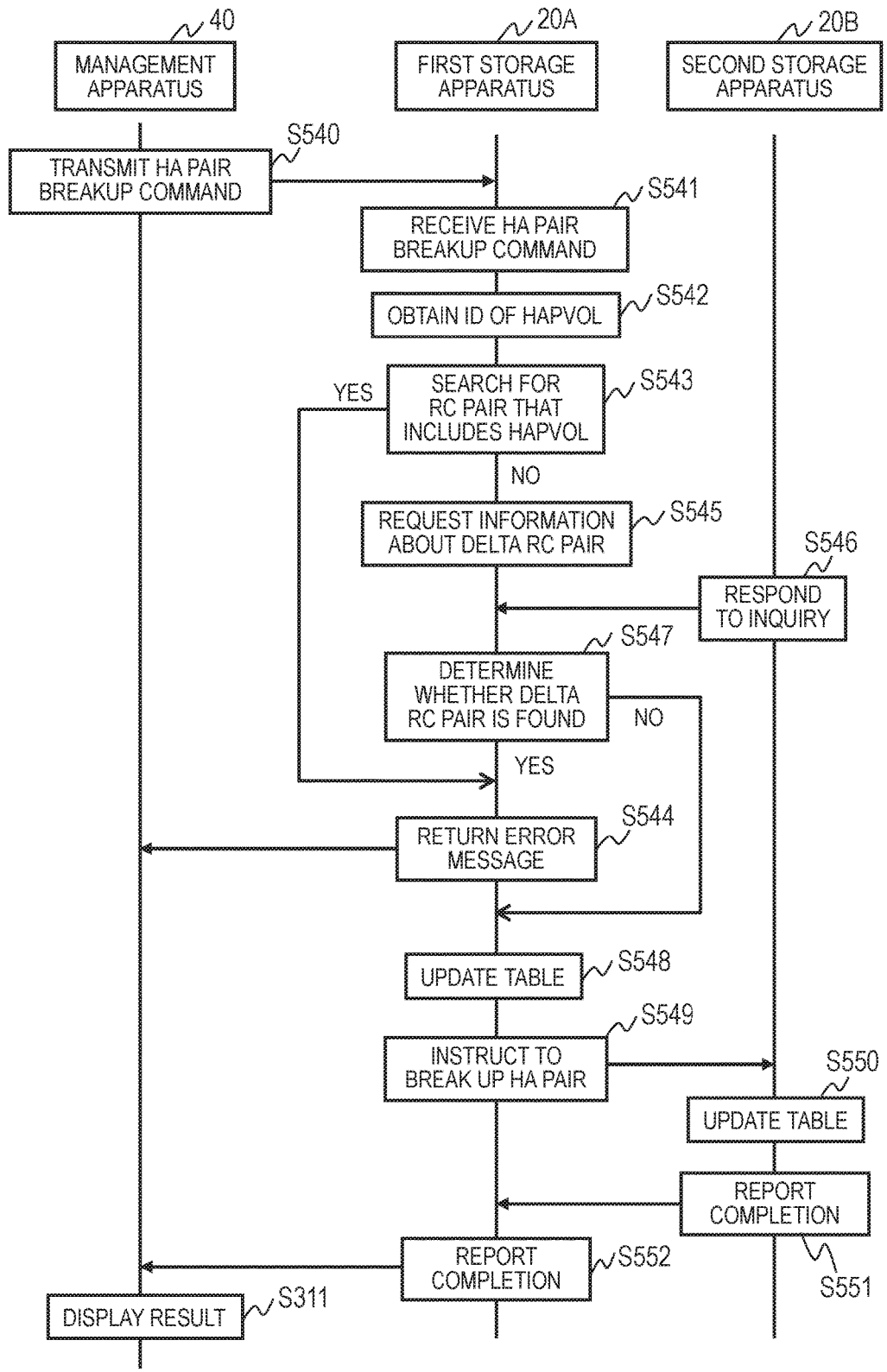
FIG. 24 depicts Processing performed on the HA pair breakup command.

Processing performed on the HA pair breakup command is illustrated in FIG. 24. The management apparatus 40 transmits to the first storage apparatus 20A an HA pair breakup command that includes the specified HA group ID (Step S540). The first storage apparatus 20A receives the HA pair breakup command (Step S541), and obtains from the HA pair management table 400 the volume ID of the HAPVOL for each HA pair in the specified HA group (Step S542).

The first storage apparatus 20A searches the RC pair management table 500 for the obtained volume ID. In the case where an RC pair that includes the specified HAPVOL is found in the RC pair management table 500 (Step S543: YES), the first storage apparatus 20A refuses to delete the HA pair, and returns a report indicating the presence of a coordinated RC pair to the management apparatus 40 (Step S544).

When there is no RC pair coordinated with the HA pair, the first storage apparatus 20A obtains from the HA pair management table 400 the volume ID of the HASVOL for each HA pair, and makes an inquiry to the second storage apparatus 20B about the presence/absence of a relevant delta RC pair (Step S545).

The second storage apparatus 20B searches the RC pair management table 500 for a delta RC pair that includes a volume having the specified volume ID, and returns the result of the search to the first storage apparatus 20A (Step S546). The first storage apparatus 20A may obtain the management information of the second storage apparatus 20B in advance. The inquiry is unnecessary in that case.

When it is determined from the search result received from the second storage apparatus 20B that the HASVOL belongs to the delta RC pair (Step S547: YES), the first storage apparatus 20A refuses to break up the HA pair and returns an error report to the management apparatus 40 along with the cause of the error (Step S544).

The management apparatus 40 outputs to the output device 45 information indicating that the HA pair specified as a pair to be broken up has an RC pair coordinated with the HA pair as notified by the report received from the first storage apparatus 20A, and that the coordinated RC pair is to be broken up first.

In the case where the condition described above and other conditions for breaking up the specified HA pair are fulfilled, the first storage apparatus 20A changes the value of the relevant cell in the pair state field 407 of the HA pair management table 400 to "SMPL", or deletes the entry for the HA pair (Step S548). The first storage apparatus 20A then instructs the second storage apparatus 20B to break up the pair by specifying the HA group (Step S549).

The second storage apparatus 20B changes the value of the relevant cell in the pair state field 407 of the HA pair management table 400 to "SMPL", or deletes the entry for the HA pair (Step S550), and transmits a completion report to the first storage apparatus 20A (Step S551). The first storage apparatus 20A transmits a completion report to the management apparatus 40 (Step S552).

3-4 Swap Resync of the HA Pair

The storage system of this embodiment executes a received swap resync command that is issued to an HA pair in the case where a volume of the HA pair that newly serves as the PVOL after swap resync of the HA pair is included in an RC pair, and a volume of the HA pair that newly serves as the SVOL is included in a delta RC pair, which are defined as a requisite condition for executing a swap resync command. The storage system rejects a swap resync command issued to an HA pair when the conditions described above are not fulfilled. This enables the coordinated copy pairs to form a normal relationship after the swap resync of the HA pair.

A swap resync command instructs a copy pair that is in the "SSWS" state to switch the SVOL to the PVOL, to switch the PVOL to the SVOL, and to change the pair state of the new PVOL and the new SVOL to "pair".

Figure 25:
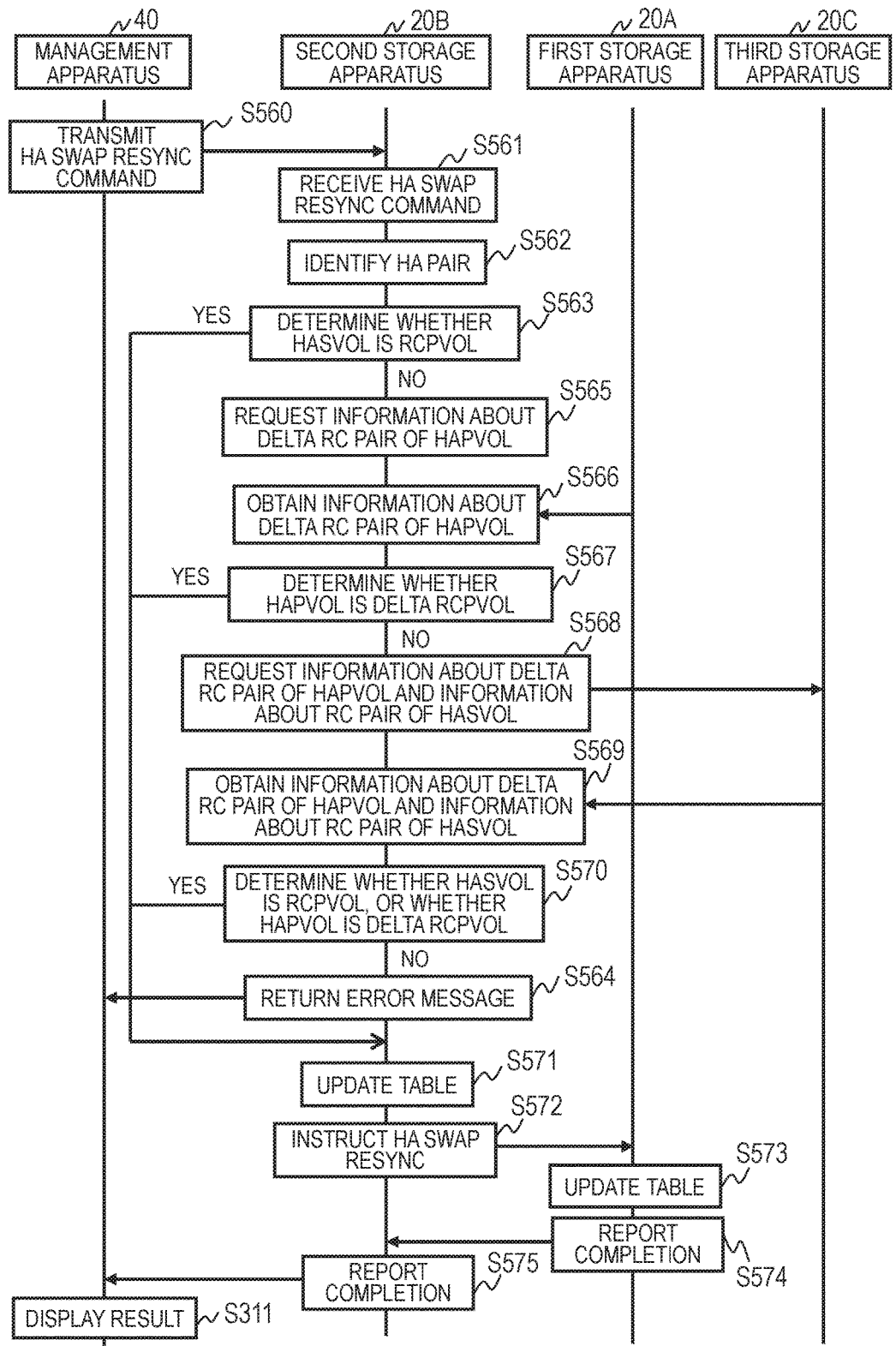
FIG. 25 depicts Processing that is performed on a swap resync command issued to an HA pair.

Processing that is performed on a swap resync command issued to an HA pair is illustrated in FIG. 25. The processing described here is executed for a swap resync command issued by the management apparatus 40 to an HA pair. The administrator uses the input device 44 and the output device 45 of the management apparatus 40 to specify an HA group ID.

The management apparatus 40 transmits a swap resync command that includes the specified HA group ID to the second storage apparatus 20B (Step S560). The second storage apparatus 20B receives the swap resync command (Step S561), and refers to the HA pair management table 400 to identify each HA pair in the HA group (Step S562). A volume of the second storage apparatus 20B serves as the HASVOL, and a volume of the first storage apparatus 20A serves as the HAPVOL.

The second storage apparatus 20B refers to the RC pair management table 500 to determine, for each HA pair, whether the HASVOL of the HA pair is the RCPVOL of an RC pair (Step S563). In the case where at least one of the HASVOLs is not the RCPVOL, the second storage apparatus 20B returns an error message to the management apparatus 40 (Step S564).

In the case where every HASVOL is an RCPVOL, the second storage apparatus 20B requests, from the first storage apparatus 20A, for each HA pair, information about a delta RC pair of the HAPVOL of the HA pair (Step S565), and obtains the information (Step S566). The first storage apparatus 20A selects the requested information from the RC pair management table 500.

The second storage apparatus 20B determines, for each HAPVOL, whether the HAPVOL is the delta RCPVOL of a delta RC pair (Step S567). When the obtained information indicates that at least one of the HAPVOLs is not a delta RCPVOL (Step S567: NO), the second storage apparatus 20B returns an error message to the management apparatus 40 (Step S564).

In the case where every HAPVOL is a delta RCPVOL, the second storage apparatus 20B requests, from the third storage apparatus 20C, for each HA pair, information about an RC pair of the HASVOL of the HA pair, and information about the delta RC pair of the HAPVOL of the HA pair (Step S568), and obtains the information (Step S569). The third storage apparatus 20C selects the requested information from the RC pair management table 500.

In the case where the obtained information indicates that at least one of the HASVOLs is not the RCSVOL, or at least one of the HAPVOLs is not the delta RCSVOL (Step S570: NO), the second storage apparatus 20B returns an error message to the management apparatus 40 (Step S564).

In the case where the condition described above and other conditions for executing swap resync of the specified HA pair are fulfilled, the second storage apparatus 20B changes values in the volume attribute fields 403 and 406 of the HA pair management table 400, and changes the value of the relevant cell in the pair state field 407 of the HA pair management table 400 to "pair" (Step S571). The second storage apparatus 20B instructs the first storage apparatus 20A to execute swap resync by specifying the HA group.

The first storage apparatus 20A updates the HA pair management table 400 in the same manner that the second storage apparatus 20B has updated its own table 400 (Step S573), and transmits a completion report to the second storage apparatus 20B (Step S574). The second storage apparatus 20B transmits a completion report to the management apparatus 40 (Step S575).

In the description given above, the storage system receives a pair operation command and determines whether to accept or reject the command. The determination of whether a command is accepted or rejected may instead be executed by the management apparatus 40 or the host computer 10. The management apparatus 40 or the host computer 10 may hold in advance the pair management information held in the storage system that is necessary for the acceptance/rejection determination, or obtains the pair management information from the storage system in response to a pair operation command.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A storage system, comprising a first storage apparatus, a second storage apparatus, and a third storage apparatus,
   the first storage apparatus and the second storage apparatus comprising a first volume and a second volume, respectively, the first volume being used as a primary volume, the second volume being used as a secondary volume, the first volume and the second volume forming a high availability pair for data duplication,
   the third storage apparatus comprising a third volume, the first volume and the third volume being used as a primary volume and a secondary volume, respectively, to form an asynchronous copy pair in which data written to one of the first volume and the second volume is copied asynchronously from the first volume to the third volume,
   the second volume and the third volume being used as a primary volume and a secondary volume, respectively, to form a standby pair in which, when a failure occurs in the first volume, data written to the second volume is copied asynchronously from the second volume to the third volume,
   wherein, when a command to form the asynchronous copy pair is received, the storage system refuses to form the asynchronous copy pair when the standby pair is not formed yet.

2. The storage system according to claim 1,
   wherein a command directed to the high availability pair is received on a copy group-by-copy group basis, and
   wherein a command to form the standby pair is rejected when the high availability pair belongs to none of the copy groups.

3. The storage system according to claim 2,
   wherein the standby pair forming command specifies a journal group that comprises the primary volume of the standby pair and a journal volume of the standby pair,
   wherein a data updating order is managed in the journal group, and
   wherein the standby pair forming command is rejected when a copy group of another high availability pair to which a primary volume of another standby pair included in the journal group belongs is separate from a copy group to which the high availability pair belongs.

4. The storage system according to claim 2,
   wherein the asynchronous copy pair forming command specifies a journal group that comprises the primary volume of the asynchronous copy pair and a journal volume of the asynchronous copy pair,
   wherein a data updating order is managed in the journal group, and
   wherein the first storage apparatus is configured to reject the asynchronous copy pair forming command when a copy group of the high availability pair to which the primary volume of the asynchronous copy pair belongs is separate from a copy group of another high availability pair to which a primary volume of another asynchronous copy pair included in the journal group belongs.

5. The storage system according to claim 1, wherein a command to form the standby pair is rejected when a pair state of the high availability pair is other than a normal synchronous copy state.

6. The storage system according to claim 1, wherein a command to form the standby pair is rejected when a primary volume indicated by the standby pair forming command has a volume attribute "primary volume" in the high availability pair.

7. The storage system according to claim 1, wherein the asynchronous copy pair forming command is rejected when a primary volume indicated by the asynchronous copy pair forming command has a volume attribute "secondary volume" in the high availability pair.

8. A method of managing a storage system, the storage system comprising a first storage apparatus, a second storage apparatus, and a third storage apparatus, the method comprising:
   using a first volume of the first storage apparatus as a primary volume, using a second volume of the second storage apparatus as a secondary volume, and forming from the first volume and the second volume a high availability pair for data duplication;
   using the first volume as a primary volume, using a third volume of the third storage apparatus as a secondary volume, and forming an asynchronous copy pair in which data written to one of the first volume and the second volume is copied asynchronously from the first volume to the third volume, using the second volume and the third volume as a primary volume and a secondary volume, respectively, to form a standby pair in which, when a failure occurs in the first volume, data written to the second volume is copied asynchronously from the second volume to the third volume; and refusing, when a command to form the asynchronous copy pair is received, to form the asynchronous copy pair when the standby pair is not formed yet.

9. The method according to claim 8, further comprising:

receiving a command directed to the high availability pair on a copy group-by-copy group basis; and rejecting a command to form the standby pair when the high availability pair belongs to none of the copy groups.

10. The method according to claim 9, wherein the standby pair forming command specifies a journal group that comprises the primary volume of the standby pair and a journal volume of the standby pair, wherein a data updating order is managed in the journal group, and wherein the method further comprises rejecting the standby pair forming command when a copy group of another high availability pair to which a primary volume of another standby pair included in the journal group belongs is separate from a copy group to which the high availability pair belongs.

11. The method according to claim 9, wherein the asynchronous copy pair forming command specifies a journal group that comprises the primary volume of the asynchronous copy pair and a journal volume of the asynchronous copy pair, wherein a data updating order is managed in the journal group, and wherein the method further comprises rejecting, by the first storage apparatus, the asynchronous copy pair forming command when a copy group of the high availability pair to which the primary volume of the asynchronous copy pair belongs is separate from a copy group of another high availability pair to which a primary volume of another asynchronous copy pair included in the journal group belongs.

12. The method according to claim 8, further comprising rejecting a command to form the standby pair when a pair state of the high availability pair is other than a normal synchronous copy state.

13. The method according to claim 8, further comprising rejecting a command to form the standby pair when a primary volume indicated by the standby pair forming command has a volume attribute "primary volume" in the high availability pair.

14. The method according to claim 8, further comprising rejecting the asynchronous copy pair forming command when a primary volume indicated by the asynchronous copy pair forming command has a volume attribute "secondary volume" in the high availability pair.

* * * * *